US010771326B2

(12) United States Patent
Zhang et al.

(10) Patent No.: US 10,771,326 B2
(45) Date of Patent: Sep. 8, 2020

(54) METHOD AND SYSTEM FOR PERFORMING OPERATIONS USING COMMUNICATIONS

(71) Applicants: Yibing Zhang, Annandale, NJ (US); H. Alan Wolf, Morris Plains, NJ (US); Limin Song, West Windsor, NJ (US); Scott W. Clawson, Califon, NJ (US); Katie M. Walker, Milford, NJ (US)

(72) Inventors: Yibing Zhang, Annandale, NJ (US); H. Alan Wolf, Morris Plains, NJ (US); Limin Song, West Windsor, NJ (US); Scott W. Clawson, Califon, NJ (US); Katie M. Walker, Milford, NJ (US)

(73) Assignee: ExxonMobil Upstream Research Company, Spring, TX (US)

(*) Notice: Subject to any disclaimer, the term of this patent is extended or adjusted under 35 U.S.C. 154(b) by 115 days.

(21) Appl. No.: 16/139,414

(22) Filed: Sep. 24, 2018

(65) Prior Publication Data
US 2019/0116085 A1    Apr. 18, 2019

Related U.S. Application Data

(60) Provisional application No. 62/572,146, filed on Oct. 13, 2017.

(51) Int. Cl.
*G06F 15/173*     (2006.01)
*H04L 12/24*      (2006.01)
(Continued)

(52) U.S. Cl.
CPC ........ *H04L 41/0803* (2013.01); *E21B 47/017* (2020.05); *E21B 47/14* (2013.01);
(Continued)

(58) Field of Classification Search
CPC ... H04L 41/0803; H04L 27/10; H04L 41/145; H04L 43/12; H04L 43/50; E21B 47/011;
(Continued)

(56) References Cited

U.S. PATENT DOCUMENTS 3,103,643 A   9/1963  Kalbfell .......................... 340/17
3,205,477 A   9/1965  Kalbfell .......................... 340/18
(Continued)

FOREIGN PATENT DOCUMENTS

CN   102733799   6/2014   ............. E21B 47/16
EP   0636763    2/1995   ............. E21B 47/12
(Continued)

OTHER PUBLICATIONS

U.S. Appl. No. 15/666,334, filed Aug. 1, 2017, Walker, Katie M. et al.
(Continued)

*Primary Examiner* — Sm A Rahman
(74) *Attorney, Agent, or Firm* — ExxonMobil Upstream Research Company-Law Department

(57) ABSTRACT

A method and system are described for communicating within a system, which may be along tubular members. The method includes constructing a communication network for tubular member, such as a wellbore accessing a subsurface region or a pipeline, and using the communication network in hydrocarbon operations, such as hydrocarbon exploration, hydrocarbon development, and/or hydrocarbon production.

36 Claims, 6 Drawing Sheets

(51) Int. Cl.
*E21B 47/16* (2006.01)
*H04L 12/26* (2006.01)
*H04B 3/46* (2015.01)
*E21B 47/14* (2006.01)
*E21B 47/017* (2012.01)
*E21B 47/26* (2012.01)
*H04L 27/10* (2006.01)
*H04Q 9/00* (2006.01)

(52) U.S. Cl.
CPC .............. *E21B 47/16* (2013.01); *E21B 47/26* (2020.05); *H04B 3/46* (2013.01); *H04L 27/10* (2013.01); *H04L 41/145* (2013.01); *H04L 43/12* (2013.01); *H04L 43/50* (2013.01); *H04Q 9/00* (2013.01); *H04Q 2209/30* (2013.01)

(58) Field of Classification Search
CPC ........ E21B 47/124; E21B 47/14; E21B 47/16; H04B 3/46; H04Q 9/00
See application file for complete search history.

(56) References Cited

U.S. PATENT DOCUMENTS

| | | | | |
|---|---|---|---|---|
| 3,512,407 | A | 5/1970 | Zill | 73/152 |
| 3,637,010 | A | 1/1972 | Malay et al. | 166/51 |
| 3,741,301 | A | 6/1973 | Malay et al. | 166/191 |
| 3,781,783 | A | 12/1973 | Tucker | 340/18 |
| 3,790,930 | A | 2/1974 | Lamel et al. | 340/18 |
| 3,900,827 | A | 8/1975 | Lamel et al. | 340/18 |
| 3,906,434 | A | 9/1975 | Lamel et al. | 340/18 |
| 4,001,773 | A | 1/1977 | Lamel et al. | 340/18 |
| 4,283,780 | A | 8/1981 | Nardi | 367/82 |
| 4,298,970 | A | 11/1981 | Shawhan et al. | 367/82 |
| 4,302,826 | A | 11/1981 | Kent et al. | 367/82 |
| 4,314,365 | A | 2/1982 | Peterson et al. | 367/82 |
| 4,884,071 | A | 11/1989 | Howard | 340/854 |
| 4,962,489 | A | 10/1990 | Medlin et al. | 367/32 |
| 5,128,901 | A | 7/1992 | Drumheller | 367/82 |
| 5,136,613 | A | 8/1992 | Dumestre, III | 375/1 |
| 5,166,908 | A | 11/1992 | Montgomery | 367/165 |
| 5,182,946 | A | 2/1993 | Boughner et al. | 73/151 |
| 5,234,055 | A | 8/1993 | Cornette | 166/278 |
| 5,283,768 | A | 2/1994 | Rorden | 367/83 |
| 5,373,481 | A | 12/1994 | Orban et al. | 367/82 |
| 5,468,025 | A | 11/1995 | Adinolfe et al. | 285/114 |
| 5,480,201 | A | 1/1996 | Mercer | 294/67.31 |
| 5,495,230 | A | 2/1996 | Lian | 340/551 |
| 5,562,240 | A | 10/1996 | Campbell | 227/130 |
| 5,592,438 | A | 1/1997 | Rorden et al. | 367/83 |
| 5,667,650 | A | 9/1997 | Face et al. | 204/298.07 |
| 5,850,369 | A | 12/1998 | Rorden et al. | 367/83 |
| 5,857,146 | A | 1/1999 | Kido | 455/38.3 |
| 5,924,499 | A | 7/1999 | Birchak et al. | 175/40 |
| 5,960,883 | A | 10/1999 | Tubel et al. | 166/313 |
| 5,995,449 | A | 11/1999 | Green et al. | 367/83 |
| 6,049,508 | A | 4/2000 | Deflandre | 367/48 |
| 6,129,784 | A | 4/2000 | Beique et al. | 340/853.2 |
| 6,125,080 | A | 9/2000 | Sonnenschein et al. | 367/134 |
| 6,128,250 | A | 10/2000 | Reid et al. | 367/153 |
| 6,177,882 | B1 | 1/2001 | Ringgenberg et al. | 340/853.7 |
| 6,236,850 | B1 | 5/2001 | Desai | 455/343 |
| 6,239,690 | B1 | 5/2001 | Burbidge et al. | 340/10.33 |
| 6,300,743 | B1 | 10/2001 | Patino et al. | 320/106 |
| 6,320,820 | B1 | 11/2001 | Gardner et al. | 367/81 |
| 6,324,904 | B1 | 12/2001 | Ishikawa et al. | 73/152.03 |
| 6,360,769 | B1 | 3/2002 | Brisco | 137/268 |
| 6,394,184 | B2 | 5/2002 | Tolman et al. | 166/281 |
| 6,400,646 | B1 | 6/2002 | Shah et al. | 367/82 |
| 6,462,672 | B1 | 10/2002 | Besson | 340/853.2 |
| 6,543,538 | B2 | 4/2003 | Tolman et al. | 166/284 |
| 6,670,880 | B1 | 12/2003 | Hall et al. | 336/132 |
| 6,679,332 | B2 | 1/2004 | Vinegar et al. | 166/373 |
| 6,695,277 | B1 | 2/2004 | Gallis | 241/191 |
| 6,702,010 | B2 | 3/2004 | Dusterhoft et al. | 166/278 |
| 6,717,501 | B2 | 4/2004 | Hall et al. | 336/132 |
| 6,727,827 | B1 | 4/2004 | Edwards et al. | 340/854.9 |
| 6,772,837 | B2 | 8/2004 | Dusterhoft et al. | 166/278 |
| 6,816,082 | B1 | 11/2004 | Laborde | 340/853.3 |
| 6,868,037 | B2 | 3/2005 | Dasgupta et al. | 367/54 |
| 6,880,634 | B2 | 4/2005 | Gardner et al. | 166/250.01 |
| 6,883,608 | B2 | 4/2005 | Parlar et al. | 166/278 |
| 6,899,178 | B2 | 5/2005 | Tubel | 166/313 |
| 6,909,667 | B2 | 6/2005 | Shah et al. | 367/83 |
| 6,912,177 | B2 | 6/2005 | Smith | 367/82 |
| 6,920,085 | B2 | 7/2005 | Finke et al. | 367/83 |
| 6,930,616 | B2 | 8/2005 | Tang et al. | 340/854.4 |
| 6,940,392 | B2 | 9/2005 | Chan et al. | 340/10.4 |
| 6,940,420 | B2 | 9/2005 | Jenkins | 340/855.6 |
| 6,953,094 | B2 | 10/2005 | Ross et al. | 166/381 |
| 6,956,791 | B2 | 10/2005 | Dopf et al. | 367/82 |
| 6,980,929 | B2 | 12/2005 | Aronstam et al. | 702/188 |
| 6,987,463 | B2 | 1/2006 | Beique et al. | 340/856.3 |
| 7,006,918 | B2 | 2/2006 | Economides et al. | 702/1 |
| 7,011,157 | B2 | 3/2006 | Costley et al. | 166/311 |
| 7,036,601 | B2 | 5/2006 | Berg et al. | 166/385 |
| 7,051,812 | B2 | 5/2006 | McKee et al. | 166/305.1 |
| 7,064,676 | B2 | 6/2006 | Hall et al. | 350/853.1 |
| 7,082,993 | B2 | 8/2006 | Ayoub et al. | 166/250.1 |
| 7,090,020 | B2 | 8/2006 | Hill et al. | 166/373 |
| 7,140,434 | B2 | 11/2006 | Chouzenoux et al. | 166/250.11 |
| 7,219,762 | B2 | 5/2007 | James et al. | 181/105 |
| 7,224,288 | B2 | 5/2007 | Hall et al. | 340/853.7 |
| 7,228,902 | B2 | 6/2007 | Oppelt | 166/250.02 |
| 7,249,636 | B2 | 7/2007 | Ohmer | 166/383 |
| 7,252,152 | B2 | 8/2007 | LoGiudice et al. | 166/386 |
| 7,257,050 | B2 | 8/2007 | Stewart et al. | 367/82 |
| 7,261,154 | B2 | 8/2007 | Hall et al. | 166/242.2 |
| 7,261,162 | B2 | 8/2007 | Deans et al. | 166/336 |
| 7,275,597 | B2 | 10/2007 | Hall et al. | 166/297 |
| 7,277,026 | B2 | 10/2007 | Hall et al. | 340/854.8 |
| RE40,032 | E | 1/2008 | van Bokhorst et al. | 455/343.2 |
| 7,317,990 | B2 | 1/2008 | Sinha et al. | 702/6 |
| 7,321,788 | B2 | 1/2008 | Addy et al. | 455/574 |
| 7,322,416 | B2 | 1/2008 | Burris, II et al. | 166/308.1 |
| 7,325,605 | B2 | 2/2008 | Fripp et al. | 166/250.01 |
| 7,339,494 | B2 | 3/2008 | Shah et al. | 340/855.7 |
| 7,348,893 | B2 | 3/2008 | Huang et al. | 340/854.3 |
| 7,385,523 | B2 | 6/2008 | Thomeer et al. | 340/854.8 |
| 7,387,165 | B2 | 6/2008 | Lopez de Cardenas et al. | 166/313 |
| 7,411,517 | B2 | 8/2008 | Flanagan | 340/854.4 |
| 7,477,160 | B2 | 1/2009 | Lemenager et al. | 340/853.1 |
| 7,516,792 | B2 | 4/2009 | Lonnes et al. | 166/308.1 |
| 7,551,057 | B2 | 6/2009 | King et al. | 340/5.72 |
| 7,590,029 | B2 | 9/2009 | Tingley | 367/82 |
| 7,595,737 | B2 | 9/2009 | Fink et al. | 340/854.4 |
| 7,602,668 | B2 | 10/2009 | Liang et al. | 367/25 |
| 7,649,473 | B2 | 1/2010 | Johnson et al. | 340/853.1 |
| 7,750,808 | B2 | 7/2010 | Masino et al. | 340/572.1 |
| 7,775,279 | B2 | 8/2010 | Marya et al. | 166/297 |
| 7,787,327 | B2 | 8/2010 | Tang et al. | 367/27 |
| 7,787,525 | B1 * | 8/2010 | Clark, Jr. | E21B 47/13 375/218 |
| 7,819,188 | B2 | 10/2010 | Auzerais et al. | 155/250 |
| 7,828,079 | B2 | 11/2010 | Oothoudt | 175/20 |
| 7,831,283 | B2 | 11/2010 | Ogushi et al. | 455/574 |
| 7,913,773 | B2 | 3/2011 | Li et al. | 175/40 |
| 7,952,487 | B2 | 5/2011 | Montebovi | 340/636.1 |
| 7,994,932 | B2 | 8/2011 | Huang et al. | 340/854.3 |
| 8,004,421 | B2 | 8/2011 | Clark | 340/854.4 |
| 8,044,821 | B2 | 10/2011 | Mehta | 340/855.7 |
| 8,049,506 | B2 | 11/2011 | Lazarev | 324/333 |
| 8,115,651 | B2 | 2/2012 | Camwell et al. | 340/853.2 |
| 8,117,907 | B2 | 2/2012 | Han et al. | 73/152.58 |
| 8,157,008 | B2 | 4/2012 | Lilley | 166/253.1 |
| 8,162,050 | B2 | 4/2012 | Roddy et al. | 166/253.1 |
| 8,220,542 | B2 | 7/2012 | Whitsitt et al. | 166/278 |
| 8,237,585 | B2 | 8/2012 | Zimmerman | 340/854.6 |
| 8,242,928 | B2 | 8/2012 | Prammer | 340/853.7 |
| 8,276,674 | B2 | 10/2012 | Lopez de Cardenas et al. | 166/373 |

(56) References Cited

U.S. PATENT DOCUMENTS

| | | | |
|---|---|---|---|
| 8,284,075 B2 | 10/2012 | Fincher et al. | 340/854.4 |
| 8,284,947 B2 | 10/2012 | Giesbrecht et al. | 381/66 |
| 8,316,936 B2 | 11/2012 | Roddy et al. | 166/253.1 |
| 8,330,617 B2 | 12/2012 | Chen et al. | 340/854.6 |
| 8,347,982 B2 | 1/2013 | Hannegan et al. | 175/5 |
| 8,358,220 B2 | 1/2013 | Savage | 340/853.1 |
| 8,376,065 B2 | 2/2013 | Teodorescu et al. | 175/40 |
| 8,381,822 B2 | 2/2013 | Hales et al. | 166/377 |
| 8,388,899 B2 | 3/2013 | Mitani et al. | 422/179 |
| 8,411,530 B2 | 4/2013 | Slocum et al. | 367/90 |
| 8,434,354 B2 | 5/2013 | Crow et al. | 73/152.04 |
| 8,494,070 B2 | 7/2013 | Luo et al. | 375/262 |
| 8,496,055 B2 | 7/2013 | Mootoo et al. | 166/278 |
| 8,539,890 B2 | 9/2013 | Tripp et al. | 109/25 |
| 8,544,564 B2 | 10/2013 | Moore et al. | 175/50 |
| 8,552,597 B2 | 10/2013 | Song et al. | 307/149 |
| 8,556,302 B2 | 10/2013 | Dole | 285/367 |
| 8,559,272 B2 | 10/2013 | Wang | |
| 8,596,359 B2 | 12/2013 | Grigsby et al. | 166/278 |
| 8,605,548 B2 | 12/2013 | Froelich | 367/82 |
| 8,607,864 B2 | 12/2013 | Mcleod et al. | 166/250.1 |
| 8,664,958 B2 | 3/2014 | Simon | 324/338 |
| 8,672,875 B2 | 3/2014 | Vanderveen et al. | 604/67 |
| 8,675,779 B2 | 3/2014 | Zeppetelle et al. | 375/340 |
| 8,683,859 B2 | 4/2014 | Godager | 73/152.54 |
| 8,689,621 B2 | 4/2014 | Godager | 73/152.54 |
| 8,701,480 B2 | 4/2014 | Eriksen | 73/152.51 |
| 8,750,789 B2 | 6/2014 | Baldemair et al. | 455/11.1 |
| 8,787,840 B2 | 7/2014 | Srinivasan et al. | 455/69 |
| 8,805,632 B2 | 8/2014 | Coman et al. | 702/89 |
| 8,826,980 B2 | 9/2014 | Neer | 166/255.1 |
| 8,833,469 B2 | 9/2014 | Purkis | 166/373 |
| 8,893,784 B2 | 11/2014 | Abad | E21B 43/26 |
| 8,910,716 B2 | 12/2014 | Newton et al. | 166/373 |
| 8,994,550 B2 | 3/2015 | Millot et al. | E21B 47/16 |
| 8,995,837 B2 | 3/2015 | Mizuguchi et al. | H04B 10/27 |
| 9,062,508 B2 | 6/2015 | Huval et al. | E21B 47/122 |
| 9,062,531 B2 | 6/2015 | Jones | E21B 47/082 |
| 9,075,155 B2 | 7/2015 | Luscombe et al. | G01V 1/226 |
| 9,078,055 B2 | 7/2015 | Nguyen et al. | H04R 5/00 |
| 9,091,153 B2 | 7/2015 | Yang et al. | E21B 47/12 |
| 9,133,705 B2 | 9/2015 | Angeles Boza | E21B 47/12 |
| 9,140,097 B2 | 9/2015 | Themig et al. | E21B 34/12 |
| 9,144,894 B2 | 9/2015 | Barnett et al. | B25B 17/00 |
| 9,206,645 B2 | 12/2015 | Hallundbaek | E21B 7/04 |
| 9,279,301 B2 | 3/2016 | Lovorn et al. | E21B 21/103 |
| 9,284,819 B2 | 3/2016 | Tolman et al. | E21B 41/00 |
| 9,284,834 B2 | 3/2016 | Alteirac et al. | E21B 47/12 |
| 9,310,510 B2 | 4/2016 | Godager | G01V 3/38 |
| 9,333,350 B2 | 5/2016 | Rise et al. | A61N 1/36082 |
| 9,334,696 B2 | 5/2016 | Hay | E21B 47/12 |
| 9,359,841 B2 | 6/2016 | Hall | E21B 23/00 |
| 9,363,605 B2 | 6/2016 | Goodman et al. | H04R 17/00 |
| 9,376,908 B2 | 6/2016 | Ludwig et al. | E21B 47/01 |
| 9,441,470 B2 | 9/2016 | Guerrero et al. | E21B 43/14 |
| 9,515,748 B2 | 12/2016 | Jeong et al. | G10L 25/90 |
| 9,557,434 B2 | 1/2017 | Keller et al. | G01V 1/52 |
| 9,617,829 B2 | 4/2017 | Dale et al. | E21B 41/00 |
| 9,617,850 B2 | 4/2017 | Fripp et al. | E21B 47/18 |
| 9,631,485 B2 | 4/2017 | Keller et al. | E21B 47/16 |
| 9,657,564 B2 | 5/2017 | Stolpman | E21B 47/16 |
| 9,664,037 B2 | 5/2017 | Logan et al. | E21B 47/122 |
| 9,670,773 B2 | 6/2017 | Croux | E21B 47/16 |
| 9,683,434 B2 | 6/2017 | Machocki | E21B 44/00 |
| 9,686,021 B2 | 6/2017 | Merino | E21B 47/16 |
| 9,715,031 B2 | 7/2017 | Contant et al. | E21B 47/122 |
| 9,721,448 B2 | 8/2017 | Wu et al. | G08B 21/20 |
| 9,750,062 B2 | 9/2017 | Deffenbaugh et al. | E21B 47/16 |
| 9,816,373 B2 | 11/2017 | Howell et al. | E21B 47/16 |
| 9,822,634 B2 | 11/2017 | Gao | E21B 47/16 |
| 9,863,222 B2 | 1/2018 | Morrow et al. | E21B 43/122 |
| 9,879,525 B2 | 1/2018 | Morrow et al. | E21B 47/12 |
| 9,945,204 B2 | 4/2018 | Ross et al. | E21B 33/127 |
| 9,963,955 B2 | 5/2018 | Tolman et al. | E21B 43/119 |
| 10,100,635 B2 | 10/2018 | Keller et al. | E21B 47/18 |
| 10,103,846 B2 | 10/2018 | van Zelm et al. | E21B 47/12 |
| 10,132,149 B2 | 11/2018 | Morrow et al. | E21B 43/267 |
| 10,145,228 B2 | 12/2018 | Yarus et al. | E21B 44/00 |
| 10,167,716 B2 | 1/2019 | Clawson et al. | E21B 47/14 |
| 10,167,717 B2 | 1/2019 | Deffenbaugh et al. | E21B 47/16 |
| 10,190,410 B2 | 1/2019 | Clawson et al. | E21B 47/14 |
| 10,196,862 B2 * | 2/2019 | Li-Leger | E21B 47/01 |
| 2002/0180613 A1 | 12/2002 | Shi et al. | E21B 47/18 |
| 2003/0015319 A1 * | 1/2003 | Green | E21B 47/18 166/250.01 |
| 2003/0056953 A1 | 3/2003 | Tumlin et al. | 166/298 |
| 2003/0117896 A1 | 6/2003 | Sakuma et al. | 367/81 |
| 2004/0020063 A1 | 2/2004 | Lewis et al. | 33/313 |
| 2004/0200613 A1 | 10/2004 | Fripp et al. | 166/250.01 |
| 2004/0239521 A1 | 12/2004 | Zierolf | 340/854.1 |
| 2005/0269083 A1 | 12/2005 | Burris, II et al. | 166/255.2 |
| 2005/0284659 A1 | 12/2005 | Hall et al. | 175/27 |
| 2006/0033638 A1 | 2/2006 | Hall et al. | 340/854.6 |
| 2006/0041795 A1 | 2/2006 | Gabelmann et al. | 714/699 |
| 2006/0090893 A1 | 5/2006 | Sheffield | 166/250.15 |
| 2007/0139217 A1 | 6/2007 | Beique et al. | 340/856.3 |
| 2007/0146351 A1 | 6/2007 | Katsurahira et al. | 345/179 |
| 2007/0156359 A1 | 7/2007 | Varsamis et al. | 702/69 |
| 2007/0219758 A1 | 9/2007 | Bloomfield | 702/190 |
| 2007/0272411 A1 | 11/2007 | Lopez de Cardenas et al. | 166/305.1 |
| 2008/0030365 A1 | 2/2008 | Fripp et al. | E21B 47/16 |
| 2008/0110644 A1 | 5/2008 | Howell et al. | 166/387 |
| 2008/0185144 A1 | 8/2008 | Lovell | 166/250.17 |
| 2008/0304360 A1 | 12/2008 | Mozer | 367/117 |
| 2009/0003133 A1 | 1/2009 | Dalton et al. | 367/82 |
| 2009/0030614 A1 | 1/2009 | Carnegie et al. | 702/6 |
| 2009/0034368 A1 | 2/2009 | Johnson | 367/83 |
| 2009/0045974 A1 | 2/2009 | Patel | 340/854.6 |
| 2009/0080291 A1 | 3/2009 | Tubel et al. | 367/81 |
| 2009/0166031 A1 | 7/2009 | Hernandez | 166/250.01 |
| 2010/0013663 A1 | 1/2010 | Cavender et al. | 340/854.3 |
| 2010/0089141 A1 | 4/2010 | Rioufol et al. | 73/152.28 |
| 2010/0133004 A1 | 6/2010 | Burleson et al. | 175/2 |
| 2010/0182161 A1 | 7/2010 | Robbins et al. | 340/853.7 |
| 2010/0212891 A1 | 8/2010 | Stewart et al. | 166/250.12 |
| 2011/0061862 A1 | 3/2011 | Loretz et al. | 166/250.11 |
| 2011/0066378 A1 | 3/2011 | Lerche et al. | 702/6 |
| 2011/0168403 A1 | 7/2011 | Patel | 166/373 |
| 2011/0188345 A1 | 8/2011 | Wang | 367/34 |
| 2011/0297376 A1 | 12/2011 | Holderman et al. | 166/278 |
| 2011/0297673 A1 | 12/2011 | Zbat et al. | 219/756 |
| 2011/0301439 A1 | 12/2011 | Albert et al. | 600/301 |
| 2011/0315377 A1 | 12/2011 | Rioufol | 166/250.17 |
| 2012/0043079 A1 | 2/2012 | Wassouf et al. | 166/250 |
| 2012/0126992 A1 | 5/2012 | Rodney et al. | 340/850 |
| 2012/0152562 A1 | 6/2012 | Newton et al. | 166/369 |
| 2012/0179377 A1 | 7/2012 | Lie | 702/6 |
| 2013/0000981 A1 | 1/2013 | Grimmer et al. | 175/45 |
| 2013/0003503 A1 | 1/2013 | L'Her et al. | 367/106 |
| 2013/0106615 A1 | 5/2013 | Prammer | 340/854.6 |
| 2013/0138254 A1 | 5/2013 | Seals et al. | 700/282 |
| 2013/0192823 A1 | 8/2013 | Barrilleaux et al. | 166/250.01 |
| 2013/0278432 A1 | 10/2013 | Shashoua et al. | 340/853.7 |
| 2013/0319102 A1 | 12/2013 | Riggenberg et al. | 73/152.28 |
| 2014/0060804 A1 | 3/2014 | Hartshorne et al. | 166/300 |
| 2014/0062715 A1 | 3/2014 | Clark | 340/853.2 |
| 2014/0102708 A1 | 4/2014 | Purkis et al. | 166/308.1 |
| 2014/0133276 A1 | 5/2014 | Volker et al. | 367/82 |
| 2014/0152659 A1 | 6/2014 | Davidson et al. | 345/420 |
| 2014/0153368 A1 | 6/2014 | Bar-Cohen et al. | 367/81 |
| 2014/0166266 A1 | 6/2014 | Read | 166/250.01 |
| 2014/0170025 A1 | 6/2014 | Weiner et al. | 422/82.01 |
| 2014/0266769 A1 | 9/2014 | van Zelm | 340/854.3 |
| 2014/0327552 A1 | 11/2014 | Filas et al. | 340/854.6 |
| 2014/0352955 A1 | 12/2014 | Tubel et al. | 166/250.15 |
| 2015/0003202 A1 | 1/2015 | Palmer et al. | 367/82 |
| 2015/0009040 A1 | 1/2015 | Bowles et al. | 340/854.6 |
| 2015/0027687 A1 | 1/2015 | Tubel | 166/72 |
| 2015/0041124 A1 | 2/2015 | Rodriguez | 166/255.1 |
| 2015/0041137 A1 | 2/2015 | Rodriguez | 166/301 |
| 2015/0152727 A1 | 6/2015 | Fripp et al. | E21B 47/14 |

(56) References Cited

U.S. PATENT DOCUMENTS

| | | | |
|---|---|---|---|
| 2015/0159481 A1 | 6/2015 | Mebarkia et al. | E21B 47/065 |
| 2015/0167425 A1 | 6/2015 | Hammer et al. | E21B 34/06 |
| 2015/0176370 A1 | 6/2015 | Greening et al. | E21B 41/00 |
| 2015/0292319 A1 | 10/2015 | Disko et al. | E21B 47/16 |
| 2015/0292320 A1 | 10/2015 | Lynk et al. | E21B 47/16 |
| 2015/0300159 A1 | 10/2015 | Stiles et al. | E21B 47/16 |
| 2015/0330200 A1 | 11/2015 | Richard et al. | E21B 44/00 |
| 2015/0337642 A1 | 11/2015 | Spacek | E21B 44/005 |
| 2015/0354351 A1 | 12/2015 | Morrow et al. | E21B 47/16 |
| 2015/0377016 A1 | 12/2015 | Ahmad | E21B 47/122 |
| 2016/0010446 A1 | 1/2016 | Logan et al. | E21B 47/122 |
| 2016/0047230 A1 | 2/2016 | Livescu et al. | E21B 47/10 |
| 2016/0047233 A1 | 2/2016 | Butner et al. | E21B 47/12 |
| 2016/0076363 A1 | 3/2016 | Morrow et al. | E21B 47/12 |
| 2016/0109606 A1 | 4/2016 | Market et al. | G01V 1/50 |
| 2016/0215612 A1 | 7/2016 | Morrow | E21B 47/122 |
| 2017/0138185 A1 | 5/2017 | Saed et al. | E21B 47/16 |
| 2017/0145811 A1 | 5/2017 | Robison et al. | E21B 47/0007 |
| 2017/0152741 A1 | 6/2017 | Park et al. | E21B 47/123 |
| 2017/0167249 A1 | 6/2017 | Lee et al. | E21B 47/14 |
| 2017/0204719 A1 | 7/2017 | Babakhani | E21B 47/0005 |
| 2017/0254183 A1 | 9/2017 | Vasques et al. | E21B 47/16 |
| 2017/0293044 A1 | 10/2017 | Gilstrap et al. | G01V 1/50 |
| 2017/0314386 A1 | 11/2017 | Orban et al. | E21B 47/091 |
| 2018/0010449 A1 | 1/2018 | Roberson et al. | E21B 47/16 |
| 2018/0058191 A1 | 3/2018 | Romer et al. | E21B 47/0007 |
| 2018/0058198 A1 | 3/2018 | Ertas et al. | E21B 47/12 |
| 2018/0058202 A1 | 3/2018 | Disko et al. | E21B 47/14 |
| 2018/0058203 A1 | 3/2018 | Clawson et al. | E21B 47/14 |
| 2018/0058204 A1 | 3/2018 | Clawson et al. | E21B 47/14 |
| 2018/0058205 A1 | 3/2018 | Clawson et al. | E21B 47/14 |
| 2018/0058206 A1 | 3/2018 | Zhang et al. | E21B 47/16 |
| 2018/0058207 A1 | 3/2018 | Song et al. | E21B 47/16 |
| 2018/0058208 A1 | 3/2018 | Song et al. | E21B 47/16 |
| 2018/0058209 A1 | 3/2018 | Song et al. | E21B 47/16 |
| 2018/0066490 A1 | 3/2018 | Kjos | E21B 33/035 |
| 2018/0066510 A1 | 3/2018 | Walker et al. | E21B 47/011 |

FOREIGN PATENT DOCUMENTS

| | | | |
|---|---|---|---|
| EP | 1409839 | 4/2005 | E21B 43/1185 |
| EP | 2677698 | 12/2013 | H04L 12/28 |
| WO | WO2002/027139 | 4/2002 | E21B 43/12 |
| WO | WO2010/074766 | 7/2010 | A41C 1/14 |
| WO | WO2013/079928 | 6/2013 | E21B 47/12 |
| WO | WO2014/018010 | 1/2014 | E21B 47/12 |
| WO | WO2014/049360 | 4/2014 | E21B 47/12 |
| WO | WO2014/100271 | 6/2014 | E21B 47/12 |
| WO | WO2014/134741 | 9/2014 | E21B 47/13 |
| WO | WO2015/117060 | 8/2015 | E21B 47/12 |

OTHER PUBLICATIONS

U.S. Appl. No. 16/139,373, filed Sep. 24, 2018, Yi, Xiaohua et al.
U.S. Appl. No. 16/139,384, filed Oct. 13, 2017, Disko, Mark M. et al.
U.S. Appl. No. 16/139,394, filed Oct. 13, 2017, Song, Limin et al.
U.S. Appl. No. 16/139,403, filed Oct. 13, 2017, Song, Limin et al.
U.S. Appl. No. 16/139,414, filed Oct. 13, 2017, Zhang, Yibing et al.
U.S. Appl. No. 16/139,421, filed Oct. 13, 2017, Song, Limin et al.
U.S. Appl. No. 16/139,427, filed Oct. 13, 2017, Disko, Mark M. et al.
U.S. Appl. No. 16/175,418, filed Oct. 30, 2018, Kent, David K. et al.
U.S. Appl. No. 62/588,067, filed Nov. 17, 2017, Song, Limin et al.
U.S. Appl. No. 62/588,080, filed Nov. 17, 2017, Kinn, Timothy F. et al.
U.S. Appl. No. 62/588,103, filed Nov. 17, 2017, Yi, Xiaohua et al.
Arroyo, Javier et al. (2009) "Forecasting Histogram Time Series with K—Nearest Neighbours Methods," *International Journal of Forecasting*, v.25, pp. 192-207.
Arroyo, Javier et al. (2011) "Smoothing Methods for Histogram-Valued Time Seriers: An Application to Value-at-Risk," *Univ. of California, Dept. of Economics*, www.wileyonlinelibrary.com, Mar. 8, 2011, 28 pages.
Arroyo, Javier et al. (2011) "Forecasting with Interval and Histogram Data Some Financial Applications," *Univ. of California, Dept. of Economics*, 46 pages.
Emerson Process Management (2011), "Roxar downhole Wireless PT sensor system," www.roxar.com, or downhole@roxar.com, 2 pgs.
Gonzalez-Rivera, Gloria et al. (2012) "Time Series Modeling of Histogram-Valued Data: The Daily Histogram Time Series of S&P500 Intradaily Returns," *International Journal of Forecasting*, v.28, 36 pgs.
Gutierrez-Estevez, M. A. et al. (2013) "Acoustic Boardband Communications Over Deep Drill Strings using Adaptive OFDM", *IEEE Wireless Comm. & Networking Conf.*, pp. 4089-4094.
Qu, X. et al. (2011) "Reconstruction fo Self-Sparse 20 NMR Spectra From undersampled Data in the Indirect Dimension", pp. 8888-8909.
U.S. Department of Defense (1999) "Interoperability and Performance Standards for Medium and High Frequency Radio Systems," MIL-STD-188-141B, Mar. 1, 1999, 584 pages.

\* cited by examiner

METHOD AND SYSTEM FOR PERFORMING OPERATIONS USING COMMUNICATIONS

CROSS REFERENCE TO RELATED APPLICATION

This application claims the priority benefit of U.S. Provisional Application No. 62/572,146 filed Oct. 13, 2017 entitled "Method and System for Performing Operations Using Communications," the entirety of which is incorporated herein.

This application is related to U.S. Provisional Application Ser. No. 62/428,367, filed Nov. 30, 2016, entitled "Dual Transducer Communications Node for Downhole Acoustic Wireless Networks and Method Employing Same," U.S. patent application Ser. No. 15/666,292, filed Aug. 1, 2017, titled "Dual Transducer Communications Node For Downhole Acoustic Wireless Networks and Method Employing Same," U.S. Provisional Application Ser. No. 62/381,330, filed Aug. 30, 2016, entitled "Communication Networks, Relay Nodes for Communication Networks, and Methods of Transmitting Data Among a Plurality of Relay Nodes," U.S. patent application Ser. No. 15/665,931, filed Aug. 1, 2017, entitled "Communication Networks, Relay Nodes for Communication Networks, and Methods of Transmitting Data Among a Plurality of Relay Nodes," U.S. Provisional Application Ser. No. 62/428,374, filed Nov. 30, 2016, entitled "Hybrid Downhole Acoustic Wireless Network," U.S. patent application Ser. No. 15/666,299, filed Aug. 1, 2017, entitled "Hybrid Downhole Acoustic Wireless Network," U.S. Provisional Application Ser. No. 62/428,385, filed Nov. 30, 2016 entitled "Methods of Acoustically Communicating And Wells That Utilize The Methods," U.S. Provisional Application Ser. No. 62/433,491, filed Dec. 13, 2016 entitled "Methods of Acoustically Communicating And Wells That Utilize The Methods," U.S. patent application Ser. No. 15/666,324, filed Aug. 1, 2017 entitled "Methods of Acoustically Communicating and Wells that Utilize the Methods," U.S. Provisional Application Ser. No. 62/428,394, filed Nov. 30, 2016, entitled "Downhole Multiphase Flow Sensing Methods," U.S. patent application Ser. No. 15/666,328, filed Aug. 1, 2017, entitled "Downhole Multiphase Flow Sensing Methods," U.S. Provisional Application Ser. No. 62/428,425 filed Nov. 30, 2016, entitled "Acoustic Housing for Tubulars," U.S. patent application Ser. No. 15/666,334 filed Aug. 1, 2017 entitled "Acoustic Housing for Tubulars" and U.S. patent application Ser. No. 15/689,182 filed Aug. 29, 2017, entitled "Acoustic Housing for Tubulars," the disclosures of which are incorporated herein by reference in their entireties.

This application is related to U.S. Provisional Applications having common inventors and assignee and filed on an even date herewith, U.S. Provisional Application No. 62/572,146, filed Oct. 13, 2017 entitled "Method and System For Performing Operations Using Communications," (2017EMEM250), U.S. Provisional Application No. 62/572,142, filed Oct. 13, 2017 entitled "Method And System For Performing Communications Using Aliasing," (2017EM317), U.S. Provisional Application No. 62/572,147, filed Oct. 13, 2017 entitled "Method and System For Performing Operations With Communications," (2017EM251), U.S. Provisional Application No. 62/572,201, filed Oct. 13, 2017 entitled "Method And System For Performing Wireless Communications Along A Drilling String," (2017EM326), U.S. Provisional Application No. 62/572,211 filed Oct. 13, 2017 entitled "Method and System for Performing Hydrocarbon Operations With Mixed Communication Networks", (2017EM252), U.S. Provisional Application No. 62/572,201 filed Oct. 13, 2017 entitled "Dual Transducer Communications Node Including Piezo Pre-Tensioning for Acoustic Wireless Networks and Method Employing Same," (2017EM326) and U.S. Provisional Application No. 62/572,152 filed Oct. 13, 2017 entitled "Method And System For Performing Wireless Communications Along A Drilling String" the disclosures of which are incorporated herein by reference in their entireties.

FIELD OF THE INVENTION

This disclosure relates generally to the field of performing operations, such as hydrocarbon exploration, hydrocarbon development, and hydrocarbon production and, more particularly, to communicating and obtaining measurement data. Specifically, the disclosure relates to methods and systems for communicating with communication nodes, which may include being disposing along one or more tubular members, such as along casing or tubing within a wellbore, along a subsea conduit and/or along a pipeline, to enhance associated operations, such as hydrocarbon exploration, hydrocarbon development, and/or hydrocarbon production.

BACKGROUND

This section is intended to introduce various aspects of the art, which may be associated with exemplary embodiments of the present disclosure. This discussion is believed to assist in providing a framework to facilitate a better understanding of particular aspects of the present invention. Accordingly, it should be understood that this section should be read in this light, and not necessarily as admissions of prior art.

In hydrocarbon exploration, hydrocarbon development, and/or hydrocarbon production operations, several real time data systems or methods have been proposed. As a first example, a physical connection, such as a cable, an electrical conductor or a fiber optic cable, is secured to a tubular member, which may be used to evaluate conditions, such as subsurface conditions or downhole conditions. The cable may be secured to an inner portion of the tubular member or an outer portion of the tubular member. The cable provides a hard wire connection to provide real-time transmission of data. Further, the cables may be used to provide high data transmission rates and the delivery of electrical power directly to downhole sensors. However, use of physical cables may be difficult as the cables have to be unspooled and attached to the tubular member sections disposed within a wellbore. Accordingly, the conduits being installed into the well may not be rotated because of the attached cables, which may be broken through such installations. This limitation may be problematic for installations into horizontal wells, which typically involve rotating the tubular members. These passages for the cables provide potential locations for leakage of fluids, which may be more problematic for configurations that involve high pressures fluids. In addition, the leakage of down-hole fluids may increase the risk of cement seal failures.

In contrast to physical connection configurations, various wireless technologies may be used for downhole communications. Such technologies are referred to as telemetry. These communication nodes communicate with each other to manage the exchange of data within the wellbore and with a computer system that is utilized to manage the hydrocarbon operations. The communication nodes may involve different wireless network types. As a first example, radio transmissions may be used for wellbore communications. However, the use of radio transmissions may be impractical or unavailable in certain environments or during certain operations. Acoustic telemetry utilizes an acoustic wireless network to wirelessly transmit an acoustic signal, such as a vibration, via a tone transmission medium. In general, a given tone transmission medium may only permit communication within a certain frequency range; and, in some systems, this frequency range may be relatively small. Such systems may be referred to herein as spectrum-constrained systems. An example of a spectrum-constrained system is a well, such as a hydrocarbon well, that includes a plurality of communication nodes spaced-apart along a length thereof.

While the downhole wireless network may be beneficial, conventional data transmission mechanisms may not be effectively utilized. The conditions within the wellbore are unknown and unpredictable, as the downhole acoustic conditions may be defined by formation, cementation, and/or fluid compositions (e.g., gas, water and oil), which vary at different locations within the wellbore. For example, the selection of the appropriate frequencies of the acoustic signals are necessary to support the predefined communication (e.g., long range communication) with minimum power consumption. In addition, the communications may be further complicated because of changes that result from hydrocarbon operations (e.g., following fracking operations).

Accordingly, there remains a need in the industry for methods and systems that are more efficient and may lessen problems associated with noisy and ineffective communication. Further, a need remains for efficient approaches to perform acoustic communications along tubular members, which may be within a wellbore. The present techniques provide methods and systems that overcome one or more of the deficiencies discussed above.

SUMMARY

In one embodiment, a method for communicating data among a plurality of communication nodes is described. The method comprising: obtaining data for a system; creating a communication network based on the obtained data, wherein the communication network includes a plurality of communication nodes, wherein the creation of the communication network comprises selecting one of one or more frequency bands, one or more individual tones, one or more coding methods, and any combination thereof; modeling the communication network in a testing unit to obtain diagnostic telemetry data; configuring the communication network at least partially based on the diagnostic telemetry data; installing the communication network with the system; and communicating between the plurality of communication nodes to perform operations.

The method may include one or more enhancements. The method may further comprise communicating between the plurality of communication nodes based on multiple frequency shift keying telemetry; may further comprise adjusting frequencies used in the multiple frequency shift keying telemetry based on the modeling in the testing unit; wherein the adjusting frequencies used in multiple frequency shift keying telemetry may comprise adjusting amplitudes of exchanged signals between a pair of communication nodes in the plurality of communication nodes; wherein the adjusting frequencies used in multiple frequency shift keying telemetry may comprise adjusting signal strength of exchanged signals between a pair of communication nodes in the plurality of communication nodes; may further comprise: obtaining measurements from one or more of the plurality of communication nodes, wherein the plurality of communication nodes are disposed along one or more tubular members, and performing hydrocarbon operations with the obtained measurements; wherein the modeling of the communication network in the testing unit may comprise disposing each of the plurality of communication nodes along one of one or more test tubular members in the testing unit and the plurality of communication nodes are spaced apart along the one or more test tubular members at a distance of at least one foot, at a distance in a range between 1 foot and 20 feet, or at a distance in a range between 2.5 feet and 5 feet; wherein the communicating between the plurality of communication nodes may comprise exchanging low-frequency signals that are less than or equal to ($\leq$) 20 kilohertz or in the range between 100 hertz and 20 kilohertz; wherein the communicating between the plurality of communication nodes may comprise exchanging high-frequency signals that are greater than ($>$) 20 kilohertz or in the range between greater than 20 kilohertz and 1 megahertz; wherein a first set of the plurality of communication nodes may be disposed in unmonitored sections of a wellbore and a second set of the plurality of communication nodes may be disposed in monitored sections of the wellbore; may further comprise: i) monitoring the communication network for an event; ii) modifying the communication network if the event is detected; and iii) continuing the communicating between the plurality of communication nodes if the event is not detected; and iv) repeating steps i) to iii) until the hydrocarbon operations are complete; wherein the event is a failure of the communication network to operate properly along the one or more tubular members; wherein the event is detection of a change in an acoustic environment along the one or more tubular members; wherein the event is the lapsing of a time period without successfully decoding a received communication; may further comprise adjusting the one or more coding methods if the event is detected; wherein the modifying the communication network may further comprise dynamically adjusting one of operation frequency bands, digital coding methods, and any combination thereof; wherein the data may be associated with equipment installed within the wellbore and the configuration of the wellbore equipment; wherein the selection of one or more coding methods may further comprise determining a set of clock ticks for communication between communication nodes; wherein the coding method may comprise performing frequency combining with two or more clock ticks per tone in communication between communication nodes; and/or may further comprise adjusting the configuration of the communication nodes in the communication network at least partially based on the acoustic media to change the one or more frequency bands.

In another embodiment, a system for modeling communications between a plurality of communication nodes is described. The system may comprising: a testing unit comprising: an optional housing with an interior region formed by the housing; one or more tubular members, which may be disposed within the housing; and a communication network, which may be disposed within the housing, wherein each of a plurality of communication nodes are disposed along the one or more tubular member and spaced apart along the one or more tubular members at a distance greater than one foot, and wherein the communication network comprises selecting one of one or more frequency bands, one or more individual tones, one or more coding methods, and any combination thereof.

The system may include one or more enhancements. The system may further comprise: wherein the plurality of communication nodes is configured to exchange data using multiple frequency shift keying telemetry; wherein the communication network in the testing unit may comprise each of the plurality of communication nodes are disposed along the one or more tubular members and the plurality of communication nodes are spaced apart along the one or more tubular members at a distance of at least one foot or at a distance in a range between 2.5 feet and 5 feet; wherein the plurality of communication nodes may be configured to exchange low-frequency signals that are less than or equal to (≤) 20 kilohertz; wherein the plurality of communication nodes may be configured to exchange low-frequency signals that are in the range between 100 hertz and 20 kilohertz; wherein the plurality of communication nodes are configured to exchange high-frequency signals that are greater than (>) 20 kilohertz or in the range between greater than 20 kilohertz and 1 megahertz; may further comprise each of the plurality of communication nodes are configured to: i) monitor the communication network for an event; ii) modify the communication network if the event is detected; and iii) provide a notification if the event is detected; wherein the selection of one or more coding methods may further comprise determining a set of clock ticks for communication between communication nodes; wherein the coding method may comprise performing frequency combining with two or more clock ticks per tone in communication between communication nodes; and/or may further comprise adjusting the configuration of the communication nodes in the communication network at least partially based on the acoustic media to change the one or more frequency bands.

BRIEF DESCRIPTION OF THE DRAWINGS

The advantages of the present invention are better understood by referring to the following detailed description and the attached drawings.

DETAILED DESCRIPTION

Figure 1:
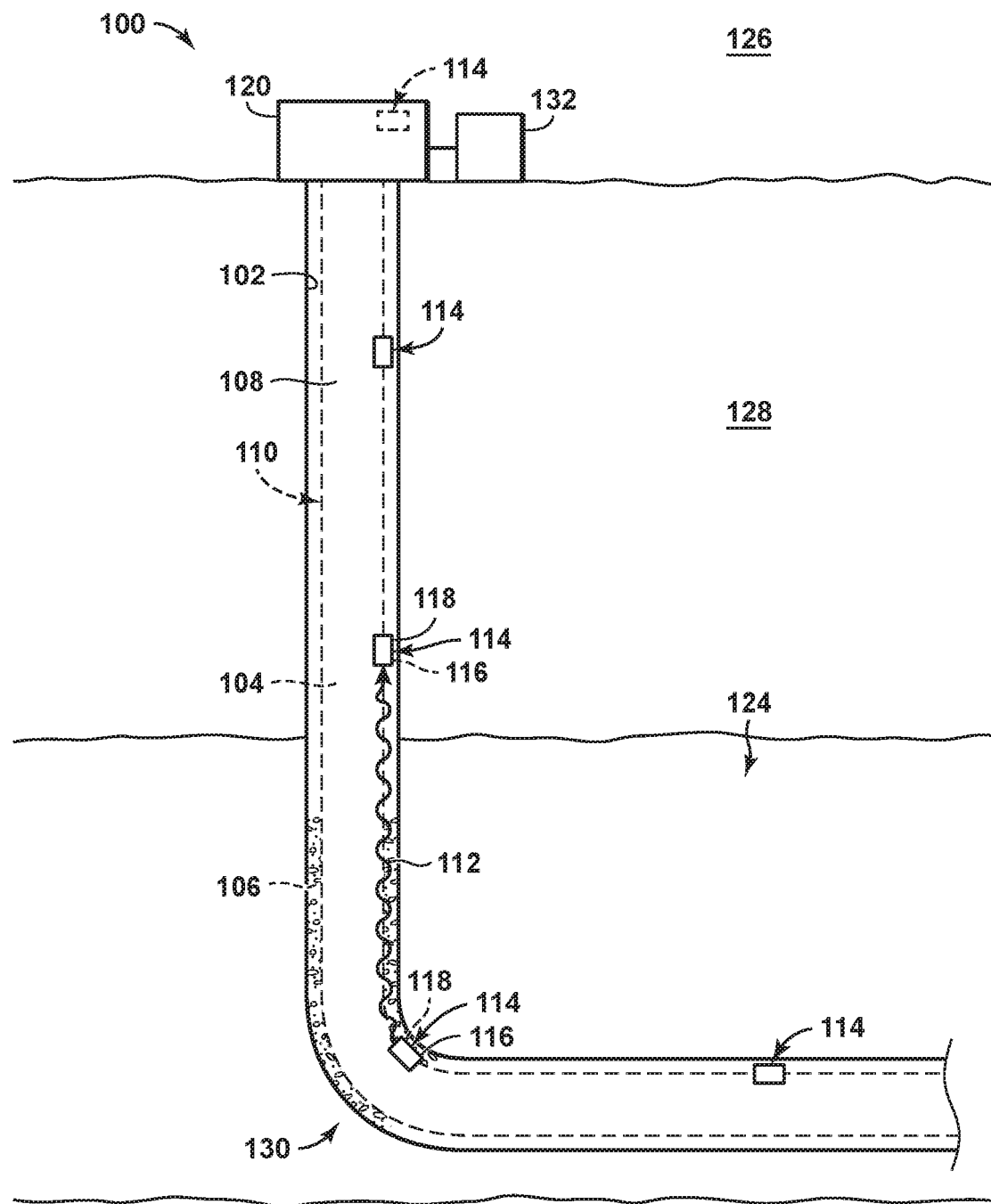
FIG. 1 is an exemplary schematic representation of a well configured to utilize the methods according to the present disclosure.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

The articles "the", "a", and "an" are not necessarily limited to mean only one, but rather are inclusive and open ended so as to include, optionally, multiple such elements.

The directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore. Continuing with the example of relative directions in a wellbore, "upper" and "lower" may also refer to relative positions along the longitudinal dimension of a wellbore rather than relative to the surface, such as in describing both vertical and horizontal wells.

As used herein, the term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements). As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of".

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

As used herein, "any" means one, some, or all indiscriminately of whatever quantity.

As used herein, "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein, "based on" does not mean "based only on", unless expressly specified otherwise. In other words, the phrase "based on" describes both "based only on," "based at least on," and "based at least in part on."

As used herein, "clock tick" refers to a fundamental unit of time in a digital processor. For example, one clock tick equals the inverse of the effective clock speed that governs operation of the processor. Specifically, one clock tick for a 1 MHz effective clock speed is equal to one microsecond. As another example, one clock tick may be equivalent to the minimum amount of time involved for a scalar processor to execute one instruction. A processor may operate at various effective clock speeds, and, as such, the amount of time equivalent to one clock tick may vary, but a fractional clock tick is not possible.

As used herein, "conduit" refers to a tubular member forming a physical channel through which something is conveyed. The conduit may include one or more of a pipe, a manifold, a tube or the like, or the liquid contained in the tubular member. Alternately, conduit refers to an acoustic channel of liquid which may, for example, exist between the formation and a tubular.

As used herein, "couple" refers to an interaction between elements and is not meant to limit the interaction to direct interaction between the elements and may also include indirect interaction between the elements described. Couple may include other terms, such as "connect", "engage", "attach", or any other suitable terms.

As used herein, "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, "one embodiment," "an embodiment," "some embodiments," "one aspect," "an aspect," "some aspects," "some implementations," "one implementation," "an implementation," or similar construction means that a particular component, feature, structure, method, or characteristic described in connection with the embodiment, aspect, or implementation is included in at least one embodiment and/or implementation of the claimed subject matter. Thus, the appearance of the phrases "in one embodiment" or "in an embodiment" or "in some embodiments" (or "aspects" or "implementations") in various places throughout the specification are not necessarily all referring to the same embodiment and/or implementation. Furthermore, the particular features, structures, methods, or characteristics may be combined in any suitable manner in one or more embodiments or implementations.

As used herein, "event" is used herein to mean a detection of a change in a communication environment along the conduit, such as a tubular member and/or any associated liquid. The event may include a change within a wellbore, a detection of a local failure in communication, a failure to operate properly, a manual trigger, and/or a lapse of a time period.

As used herein, "exemplary" is used exclusively herein to mean "serving as an example, instance, or illustration." Any embodiment described herein as "exemplary" is not necessarily to be construed as preferred or advantageous over other embodiments.

As used herein, "formation" refers to any definable subsurface region. The formation may contain one or more hydrocarbon-containing layers, one or more non-hydrocarbon containing layers, an overburden, and/or an underburden of any geologic formation.

As used herein, "hydrocarbons" are generally defined as molecules formed primarily of carbon and hydrogen atoms such as oil and natural gas. Hydrocarbons may also include other elements or compounds, such as, but not limited to, halogens, metallic elements, nitrogen, oxygen, sulfur, hydrogen sulfide ($H_2S$), and carbon dioxide ($CO_2$). Hydrocarbons may be produced from hydrocarbon reservoirs through wells penetrating a hydrocarbon containing formation. Hydrocarbons derived from a hydrocarbon reservoir may include, but are not limited to, petroleum, kerogen, bitumen, pyrobitumen, asphaltenes, tars, oils, natural gas, or combinations thereof. Hydrocarbons may be located within or adjacent to mineral matrices within the earth, termed reservoirs. Matrices may include, but are not limited to, sedimentary rock, sands, silicilytes, carbonates, diatomites, and other porous media.

As used herein, "hydrocarbon exploration" refers to any activity associated with determining the location of hydrocarbons in subsurface regions. Hydrocarbon exploration normally refers to any activity conducted to obtain measurements through acquisition of measured data associated with the subsurface formation and the associated modeling of the data to identify potential locations of hydrocarbon accumulations. Accordingly, hydrocarbon exploration includes acquiring measurement data, modeling of the measurement data to form subsurface models, and determining the likely locations for hydrocarbon reservoirs within the subsurface. The measurement data may include seismic data, gravity data, magnetic data, electromagnetic data, and the like. The hydrocarbon exploration activities may include drilling exploratory wells.

As used herein, "hydrocarbon development" refers to any activity associated with planning of extraction and/or access to hydrocarbons in subsurface regions. Hydrocarbon development normally refers to any activity conducted to plan for access to and/or for production of hydrocarbons from the subsurface formation and the associated modeling of the data to identify preferred development approaches and methods. By way of example, hydrocarbon development may include modeling of the subsurface formation and extraction planning for periods of production, determining and planning equipment to be utilized and techniques to be utilized in extracting the hydrocarbons from the subsurface formation, and the like.

As used herein, "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (20° Celsius (C) and 1 atmospheric (atm) pressure). Hydrocarbon fluids may include, for example, oil, natural gas, gas condensates, coal bed methane, shale oil, shale gas, and other hydrocarbons that are in a gaseous or liquid state.

As used herein, "hydrocarbon operations" refers to any activity associated with hydrocarbon exploration, hydrocarbon development, collection of wellbore data, and/or hydrocarbon production. It may also include the midstream pipelines and storage tanks, or the downstream refinery and distribution operations. By way of example, the hydrocarbon operations may include managing the communications for the wellbore through the communication nodes by utilizing the tubular members, such as drilling string and/or casing.

As used herein, "hydrocarbon production" refers to any activity associated with extracting hydrocarbons from subsurface location, such as a well or other opening. Hydrocarbon production normally refers to any activity conducted to form the wellbore along with any activity in or on the well after the well is completed. Accordingly, hydrocarbon production or extraction includes not only primary hydrocarbon extraction, but also secondary and tertiary production techniques, such as injection of gas or liquid for increasing drive pressure, mobilizing the hydrocarbon or treating by, for example, chemicals, hydraulic fracturing the wellbore to promote increased flow, well servicing, well logging, and other well and wellbore treatments.

As used herein, "mode" refers to a setting or configuration associated with the operation of communication nodes in a communication network. For example, the mode may include a setting for acoustical compression wave, acoustical shear wave, or any combination thereof.

As used herein, "monitored section" and "monitored sections" refer to locations along the tubular members that include sensors and/or are regions of interest.

As used herein, "unmonitored section" and "unmonitored sections" refer to locations along the tubular members that do not include sensors and/or are not regions of interest.

As used herein, "operatively connected" and/or "operatively coupled" means directly or indirectly connected for transmitting or conducting information, force, energy, or matter.

As used herein, "optimal", "optimizing", "optimize", "optimality", "optimization" (as well as derivatives and other forms of those terms and linguistically related words and phrases), as used herein, are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms may describe one or more of: 1) working towards a solution which may be the best available solution, a preferred solution, or a solution that offers a specific benefit within a range of constraints; 2) continually improving; 3) refining; 4) searching for a high point or a maximum for an objective; 5) processing to reduce a penalty function; 6) seeking to maximize one or more factors in light of competing and/or cooperative interests in maximizing, minimizing, or otherwise controlling one or more other factors, etc.

As used herein, "potting" refers to the encapsulation of electrical components with epoxy, elastomeric, silicone, or asphaltic or similar compounds for the purpose of excluding moisture or vapors. Potted components may or may not be hermetically sealed.

As used herein, "range" or "ranges", such as concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, etc. and sub-ranges such as 10 to 50, 20 to 100, etc. Similarly, it should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

As used herein, "sealing material" refers to any material that can seal a cover of a housing to a body of a housing sufficient to withstand one or more downhole conditions including but not limited to, for example, temperature, humidity, soil composition, corrosive elements, pH, and pressure.

As used herein, "sensor" includes any electrical sensing device or gauge. The sensor may be capable of monitoring or detecting pressure, temperature, fluid flow, vibration, resistivity, or other formation data. Alternatively, the sensor may be a position sensor.

As used herein, "stream" refers to fluid (e.g., solids, liquid and/or gas) being conducted through various regions, such as equipment and/or a formation. The equipment may include conduits, vessels, manifolds, units or other suitable devices.

As used herein, "subsurface" refers to geologic strata occurring below the earth's surface.

As used herein, "telemetry diagnostic data", "diagnostic telemetry data", or "telemetry data" refer to data associated with the communication nodes exchanging information. The telemetry data may be exchanged for the purpose of assessing and proving or otherwise optimizing the communication. By example, this may include frequency and/or amplitude information.

As used herein, "physical layer" refers to the lowest layer of the Open Systems Interconnection model (OSI model) maintained by the identification ISO/IEC 7498-1. The OSI model is a conceptual model that partitions a communication system into abstraction layers. The physical layer defines basic electrical and physical specifications of the network such as acoustic frequency band, radio-frequency (RF) frequency band, acoustic versus electromagnetic communication, and other electrical and physical aspects of the communication.

As used herein, "direct mapping" refers to establishing a correspondence between communication frequencies and symbolic information such that particular communication frequencies represent a particular piece of symbolic information. Examples of symbolic information include, but are not limited to, the letters in alphabet or specific arrangements of bits in a computer memory. By way of example, direct mapping in an acoustic telemetry system may include each 100 kHz tone representing the letter "A", each 102 kHz tone representing the letter "B", each 104 kHz tone representing the letter "C", and so on. By contrast, "spread spectrum" may involve a correspondence between communication frequencies and symbolic information that changes repeatedly and in rapid fashion, such that, by way of example, a 100 kHz tone may represent the letter "A" and a 104 kHz tone may represent the letter "B" and a 102 kHz tone may represent the letter "C", then a 110 kHz tone may represent the letter "A" and a 112 kHz tone may represent the letter "B" and a 114 kHz tone may represent the letter "C", then a 90 kHz tone may represent the letter "A" and a 84 kHz tone may represent the letter "B" and a 96 kHz tone may represent the letter "C", and so on. In addition, the direct mapping may not change, while spread spectrum may change.

As used herein, "frequency combining" refers to aggregating similar frequencies by dividing the range of possible frequencies into a number of sections and classifying all frequencies within any one section as occurrences of a single frequency. It will be apparent to a person skilled in the computational arts that the totality of possible frequencies may be excessively large, leading to an excessive degree of computational complexity inherent in analysis of the frequencies, and that frequency combining can limit the number of possibilities to reduce the computational complexity inherent in analysis of the possibilities to an acceptable level. The limited number of possibilities resulting from frequency combining may be referred to as the "combined frequencies". The cadence of digital clock ticks acts as an upper bound on the number of possible combined frequencies in all cases.

As used herein, "signal strength" refers to a quantitative assessment of the suitability of a characteristic for a particular purpose. A characteristic may be an amplitude, a Fast Fourier Transform (FFT) magnitude, a signal-to-noise ratio (SNR), a zero crossing (ZCX) quality, a histogram quantity, an occurrence count, a margin or proportion above a baseline, or any other suitable measurement or calculation. By way of example, a histogram representing ZCX occurrence counts by period may assess ZCX signal strength for each period by dividing the occurrence count for each period by the maximum occurrence count in the histogram such that the ZCX signal strength for the period having the maximum occurrence count is 1 and this is the highest ZCX signal strength among all the periods in the histogram.

As used herein, "tubular member", "tubular section" or "tubular body" refer to any pipe, such as a joint of casing, a portion of a liner, a drill string, a production tubing, an injection tubing, a pup joint, a buried pipeline, underwater piping, or above-ground piping. Solid lines therein, and any suitable number of such structures and/or features may be omitted from a given embodiment without departing from the scope of the present disclosure.

As used herein, "wellbore" or "downhole" refers to a hole in the subsurface made by drilling or insertion of a conduit into the subsurface. A wellbore may have a substantially circular cross section, or other cross-sectional shape. As used herein, the term "well," when referring to an opening in the formation, may be used interchangeably with the term "wellbore."

As used herein, "well data" may include seismic data, electromagnetic data, resistivity data, gravity data, well log data, core sample data, and combinations thereof. The well data may be obtained from memory or from the equipment in the wellbore. The well data may also include the data associated with the equipment installed within the wellbore and the configuration of the wellbore equipment. For example, the well data may include the composition of the tubular members, thickness of the tubular members, length of the tubular members, fluid composition within the wellbore, formation properties, cementation within the wellbore and/or other suitable properties associated with the wellbore.

As used herein, "zone", "region", "container", or "compartment" is a defined space, area, or volume contained in the framework or model, which may be bounded by one or more objects or a polygon encompassing an area or volume of interest. The volume may include similar properties.

The exchange of information may be used to manage the operations for different technologies. By way of example, the communication network may include communication nodes disposed along one or more tubular members. The communication nodes may be distributed along casing or tubing within a wellbore, along a subsea conduit and/or along a pipeline, to enhance associated operations. To exchange information, the communication network may include physically connected communication nodes, wirelessly connected communication nodes or a combination of physically connected communication nodes and wirelessly connected communication nodes.

By way of example, the communication network may be used for data exchanges of operational data, which may be used for real-time or concurrent operations involving hydrocarbon exploration operations, hydrocarbon development operations, and/or hydrocarbon production operations, for example. In hydrocarbon operations, the system or method may involve communicating via a downhole network including various communication nodes spaced-apart along a length of tubular members, which may be a tone transmission medium (e.g., conduits). The communication nodes may communicate with each other to manage the exchange of data within the wellbore and with a computer system that is utilized to manage the hydrocarbon operations. By way of example, the communication network may involve transmitting and/or receiving signals or tones via one or more frequencies of acoustic tones in the form of data packets via the tone transmission medium. The downhole wireless communication through the tubular members, such as casing and/or production tubing, may be beneficial for enhancing hydrocarbon operations, such as optimizing drilling, optimizing and managing completions, and performing well management. In such communications, the communication network may include communication nodes that utilize ultrasonic acoustic frequencies to exchange information.

In certain configurations, the communication nodes may include a housing that isolates various components from the wellbore environment. In particular, the communication nodes may include one or more encoding components, which may be configured to generate and/or to induce one or more acoustic tones within tone transmission medium, such as a tubular member or liquid inside the tubular member.

Alternately, conduit refers to an acoustic channel of liquid which may, for example, exist between the formation and a tubular member. In addition, the communication nodes may include one or more decoding components, which may be configured to receive and/or decode acoustic tones from the tone transmission medium. The communication nodes may include one or more power supplies configured to supply energy to the other components, such as batteries. The communication nodes may include one or more sensors, which may be configured to obtain measurement data associated with the downhole environment and/or the formation. The communication nodes may include relatively small transducers to lessen the size of the communication nodes, such that they may be disposed or secured to locations having limited clearance, such as between successive layers of downhole tubular members. As an example, small acoustic transducers may be configured to transmit and/or receive tones.

To manage the transmission and reception of signals, the processor in the communication node may operate at one or more effective clock speeds. The presence of a clock in a digital system, such as a communication node, results in discrete (not continuous) sampling, and is frequency combining (e.g., any frequency that falls between clock ticks is detected at the higher tick or lower tick (because fractional ticks are not permitted), so in a sense, the frequencies that fall between clock ticks result in combined frequencies. The communication nodes may operate at a high-frequency effective clock speed and/or a low-frequency effective clock speed.

The effective clock speed is the clock speed at which the processor operates after inclusion of applicable clock multipliers or clock dividers. As a result, the sampling frequency is equal to the effective clock speed, while the telemetry frequency is the frequency of a given telemetry tone. By way of example, the telemetry frequency may be less than or equal to 200 kHz, less than or equal to 150 kHz, less than or equal to 75 kHz or less than or equal to 50 kHz, or even the range may be between greater than 20 kHz and 1 MHz, in the range between greater than 20 kHz and 750 kHz, in the range between greater than 20 kHz and 500 kHz. The high-frequency effective clock speed may be may be greater than 200 kHz, greater than or equal to 500 kHz, greater than or equal to 1 MHz, greater than or equal to 10 MHz or greater than or equal to 100 MHz.

Downhole communications along the tubular members, such as casing and/or production tubing, may be beneficial for enhancing hydrocarbon operations, such as optimizing drilling, completions, and well management. The present techniques may include various enhancements, such as frequency selection, which may utilize laboratory and/or surface testing facilities and acoustic waveguide theory. Another enhancement may include frequency optimization, which involves broadcast broadband signals locally between downhole neighboring communication nodes. For the frequency optimization, only the strongest acoustic signals may be selected and may be used for communication between each pair of communication nodes. Also, acoustic signals may be the same or different among different pairs of communication nodes in the system. As yet another enhancement, adaptive coding methods may be selected to support communication based on the selected number of acoustic frequencies. For one extreme case, the communication can still be successful when the right coding method is selected if the number of acoustic frequencies is limited, e.g. one frequency. However, the communication data rate will be compromised once the number of acoustic frequencies becomes limited. Further, the set of acoustic frequencies and coding method may also be re-evaluated and updated at various time intervals and/or as acoustic condition changes.

The communication network may include different types of wireless communication nodes that form respective wireless communication networks. The wireless networks may include long-range communication nodes (e.g., having a range between about 1 foot to about 1,000 feet, in a range between about 100 feet to 500 feet or even up to 1,000 feet). The long-range communication nodes may be formed into communication networks (e.g., an ultrasonic acoustic communication network) that may involve using a multiple frequency shift keying (MFSK) communication configuration. In MFSK communication configurations, reliable detection and decoding of the acoustic signal frequencies is the basis for this type of communication. As noted above, the unknown and unpredictable downhole acoustic conditions may be defined from the formation, cementation, and/or composition (e.g., gas, water and/or oil). Accordingly, it may be difficult to select the frequencies for acoustic signals to be utilized between the communication nodes prior to deployment within the wellbore to support a desired communication (e.g., long range communication) with minimum power consumption.

As another enhancement, the frequency ranges utilized for the communication network may be adjusted dynamically. In particular, the acoustic communication channel between each pair of communication nodes may be variable over a small frequency range. The frequency selectivity is a result of the coupling of acoustic signals to the tubular members from individual communication nodes, which may be influenced by the installation, but also may be influenced by conditions, such as the acoustic signal propagation path variations along the wellbore (e.g., formation, cement, casing, and/or composition of gas, water, and oil). As a further influence, the coupling and propagation of an acoustic signal may be disrupted after performing hydrocarbon operations (e.g., after fracking in unconventional wells). As a result, selecting one pre-selected set of acoustic frequencies for the entire communication system operational life is likely to be limiting.

By selecting and optimizing the acoustic frequencies in combination with adaptive coding methods between each pair of communication nodes, the present techniques provide a system and method to support reliable long range communication along tubular members, such as in the downhole environment. The frequency band selection method for communication networks may utilize laboratory and/or surface testing facilities and acoustic waveguide theory. Then, if needed, the individual acoustic frequencies may be further optimized after the communication nodes are deployed along the tubular members, such as once disposed into the wellbore. The acoustic signals with the highest signal strength in a broad frequency band are selected and used for communication between each pair of communication nodes, and they may be the same or different among different pairs of communication nodes in the system. After the frequencies are selected, one of several coding methods may be selected and adapted to support communication based on the selected number of acoustic frequencies. Within a specific time and/or condition changes, the set of acoustic frequencies and coding methods may be re-evaluated and updated to re-optimize system's communication reliability and speed.

The present techniques may include performing certain operations or steps. First, a selection of acoustic frequency band and individual frequencies for the communication system may be performed. The selection may be performed using diagnostic telemetry data above grade, identify or narrow down the frequency range for the wellbore system. The selection may include preselecting an acoustic communication frequency band based on acoustic waveguide theory. In certain configurations, the selection of acoustic frequency band and individual frequencies for the communication system may involve a testing unit. The testing unit may include installing and configuring the communication nodes in the communication network, which may include one or more wireless networks, in the testing unit. The testing unit may be a system that includes one or more tubular members and the associated communication nodes distributed along the tubular members within a housing of the testing unit. The testing unit may also contain a fluid disposed within or around the tubular members coupled to the housing. The verification of the communication network may include performing testing and/or verification of the communication nodes in the proposed communication network configuration, which is installed in the testing unit. By way of example, the testing unit may include a same size casing without surrounding cement, (e.g., representing the tubular member) may be used to pre-select an acoustic communication frequency band or individual frequencies for a downhole system. This casing may be filled with water, air or any combination thereof to preselect the acoustic communication frequency band or individual frequencies. The communication nodes may be using the same size and types of acoustic transducers, same acoustic vibration types, same acoustic coupling structure and attachment methods to the testing casing. In the testing unit, pair of communication nodes may be coupled to the tubular member, employing either amplitude or a suitable frequency decoding algorithms as a criterion to determine the optimal frequencies within frequency band. Further, the communication nodes may be separated by distances as small as one foot and may provide results consistent with a longer separation. For example, in steel at 100 kHz, the distance of one foot is considered far-field when compared to a wavelength of approximately two inches (in) in the ultrasonic band. Accordingly, each of the communication nodes are disposed along a tubular member in the testing unit and spaced apart along the tubular member at a distance of at least one foot, may be in a range between 1 foot and 20 feet, in a range between 2 feet and 10 feet, or in a range between 2.5 feet and 5 feet. Beneficially, the approach enhances the reliability of the frequency band selection without or by minimizing the need for replicating the tests for frequency selection under downhole acoustic environment. Moreover, a collateral benefit of this unexpected result is the availability of a test facility to confirm fully the operability of the electronic and transduction system to provide optimal performance with regard to the respective frequency responses.

Second, an acoustic communication band may be optimized between each pair of communication nodes along the tubular members (e.g., downhole) using diagnostic telemetry data. The tone selection may determine acoustic frequency availability. The tone selection may include sending individual tones within a likely frequency range for telemetry (e.g., within the range of 50 kilohertz (kHz) to 100 hertz (Hz) or lower/higher) at predefined steps (e.g., 1 Hz or more) from a first communication node N1 to a second node N2. Then, frequencies correctly decoded by the second communication node N2 are denoted as a first subset S1 and the second communication node N2 sends the tones in the first subset S1 back to the first communication node N1. The frequencies correctly decoded by the first communication node N1 are denoted as a second subset S2, where the number of second subset tones S2 is less than or equal to (1 the number of first subset tones S1. Within the set of correctly decoded tones, a number of tones are assigned among the second subset S2 for communications between the first communication node N1 and the second communication node N2. The specific selected tones assigned depends on the signal strength of each tone relative to the other tones, and the number of tones needed for the selected coding method, which is discussed further below. The tones are the optimal performers in the acoustic channel between the first communication node N1 and the second communication node N2, as a direct result of downhole signal generation, two-way propagation and detection.

In addition, the acoustic communication band optimization may involve selecting an ultrasonic band (e.g., in a range between 50 kHz and 100 kHz, and/or may include lower ranges or higher ranges), which may be based on above grade tests and to avoid acoustic background interference. This may provide reliable communications for ranges up to 1,000 feet in the wellbore using this frequency band. The frequency band may lessen influence to lower frequency acoustic background noises (e.g., in a range between 400 Hz and 2 kHz), which are associated with the periodic pipe-joint structures.

Figure 5:
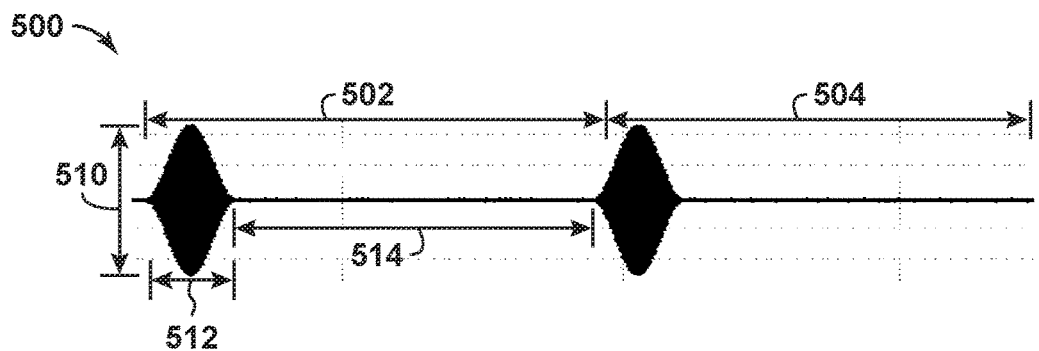
FIG. 5 is an exemplary diagram of an acoustic communication signal used in a system.

Then, the acoustic communication band optimization may include selecting parameters in each communication node (e.g., voltage or amplitude, ping time and wait time as defined in FIG. 5). These parameters may be preset. For example, the parameters values may be 100 Volt amplitude, 10 milliseconds (ms) ping time and 30 ms wait time. The parameters may be in a range between 25 volt amplitude and 200 volt amplitude; in a range between 50 volt amplitude and 150 volt amplitude; or in a range between 75 volt amplitude and 125 volt amplitude. Other parameters may be in a range between 0.5 millisecond (ms) ping time and 30 ms ping time; in a range between 5 ms ping time and 20 ms ping time; or in a range between 7 ms ping time and 15 ms ping time, while the parameters may be in a range between 5 ms wait time and 70 ms wait time; in a range between 10 ms wait time and 50 ms wait time; or in a range between 20 ms wait time and 40 ms wait time.

The acoustic communication band optimization may also include determining the options for pairing the communication nodes. There are multiple options to pair communication nodes and to optimize the acoustic frequency band between them. A first option may be based on the communication node identification (ID) to perform acoustic frequency selection on each successive pair of nodes (e.g., first communication node N1 and second communication node N2, second communication node N2 and third communication node N3, third communication node N3 and fourth communication node N4, and continues on for each of the communication nodes in the wellbore). The other communication nodes not involved in a respective pairing (e.g., not the communications nodes directly adjacent to the communication nodes that are performing the pairing operation) may receive or listen to the communication nodes that are performing the pairing operations. The other communication nodes may determine, identify and store the paired communication nodes that are received and decoded at the respective communication node and may validate longer paths via an explicit acoustic frequency selection (e.g., first communication node N1 to third communication node N3 or fourth communication node N4). Alternatively, as a second option, the communication node selection may be based on an assessment of the distance between the nodes. By way of example, based on review and analysis, a separation distance of about 40 feet may be a conservative distance between two paired communication nodes. A longer separation distance may become feasible if a large number of strong tones are available between the paired communication nodes. As another example, a re-assessment may occur following changes in environmental conditions near the tubular member (e.g., the acoustic conditions), resulting in the selection of different communication nodes, with this re-assessment partially based on prior acoustic assessments performed by other communication nodes.

Further, the acoustic communication band optimization may also include selecting a tone detection method. The tone detection method may include a fast Fourier transform (FFT), zero crossing (ZCX) and any combination thereof. The tones may be defined as decoded or detected if FFT recognizes the correct frequencies or ZCX recognizes the correct periods. The FFT and/or ZCX may be selected depending on computational power and energy efficiency of the microcontroller deployed in the communication node. For FFT, tone selection may be based on the relative magnitude of each tone. FFT may involve greater computational power, but is more able to handle background noise. For ZCX, tone selection may be based on normalized period of zero crossings of each tone. ZCX may involve less computational power, but may be vulnerable to misdetections due to background noise. Further, FFT may be supplemented by post processing curve fitting and ZCX may be implemented in a variety of different methods.

Both methods may only involve a tone to be detected within a specific range rather than an exact frequency. This aspect is shown further below in FIG. 8.

In other configurations, the communication nodes may include various different configurations. By way of example, the communication nodes may include a single transducer for low-frequency acoustic communication and high-frequency acoustic communication. Other communication nodes may include a separate low-frequency acoustic transducer and a high frequency acoustic transducer, or a combination of radio frequency transducers along with low-frequency and/or high-frequency vibration, and software and/or control electronics for transmission, sensitive detection, timing adjustment, and sensing. Also, the communication nodes may include robust algorithms for manually switching or auto-switching the network physical layer types (e.g., low-frequency, high-frequency, radio frequency, and other suitable types of wireless networks) based on changes in tubular members, flowing media, formation, or downhole devices themselves, which may hinder one or more of the available physical communication channels (propagating wave type).

By way of example, the configuration may include a combination of two or more types of networks (e.g., physically connected or wired networks and/or wireless networks), which may include different communication nodes. The communication nodes may include low-frequency communication nodes; high-frequency communication nodes; communication nodes configured to communicate with high-frequencies and low-frequencies signals and communication nodes that are configured to communicate with low and/or high frequency radio frequencies (RF). The low-frequency communication nodes may be configured to transmit signals and to receive signals that are less than or equal to ($\leq$) 20 kHz. In particular, the low-frequency communication nodes may be configured to exchange signals in the range between 100 Hz and 20 kHz; in the range between 1 kHz and 20 kHz; and in the range between 5 kHz and 20 kHz. The communication nodes may also include high-frequency communication nodes configured to transmit and receive signals that are greater than (>) 20 kHz). Also, the high-frequency communication nodes may be configured to exchange signals in the range between greater than 20 kHz and 1 MHz, in the range between greater than 20 kHz and 750 kHz, in the range between greater than 20 kHz and 500 kHz.

Third, a coding method may be selected. The coding method refers to the two-way translation between acoustic tones and digital information. The coding methods selection may be based on acoustic channel capacity (e.g., the available number of tones in a subset for the communication node, such as the second subset S2). The adaptive coding method may address frequencies that fail to be established (e.g., drop-off frequencies due to interference or noise), frequency selective attenuation and communication node installations. Examples of coding methods on the tones from the subset are: (i) direct mapping method; and (ii) spread spectrum methods. As an example of using an extremely weak acoustic channel, a single tone may be used in a direct mapping method for a communication band using a single frequency. As another example using an extremely strong acoustic channel, a predetermined number of tones having optimal signal strength may be organized as an optimal arrangement of either spread spectrum or direct mapping, chosen based on an optimal combination of high rate of communication, a low error rate, and/or low power consumption. This step may include use of diagnostic telemetry data.

Fourth, the frequency selection, which is described above with regard to a second step, and the coding selection, which is described above with regard to third step, may be repeated. The repeating of the frequency selection and coding selection may be performed between the communication node pairs in the system to provide a reliable communication network (e.g., downhole communication network).

Fifth, the network may be re-evaluated whenever an event is detected. An event may be when the network fails to operate properly. The failure to operate properly may be based on the detection of a local failure; detection of a change in the acoustic environment; detection of a manual trigger and/or detection of a time based period. By way of example, a local failure may be determined if two communication nodes do not communicate with each other after a certain number of attempts (e.g., three failed attempts to communicate and/or five or more failed attempts to communicate). Further, a full system re-evaluation may be performed based on a change in the acoustic environment (e.g., cement, production, injection, and/or fracking). The detection of the acoustic environment changes may involve detecting the environment, and/or determining a change in the environment (e.g., comparing the detected environment with a specific threshold to determine if the change is above the specific threshold). Also, the detection of a manual trigger may be based on a notification transmitted in the system (e.g., a signal from a control unit or top communication node). The detection of a time based period may include determining whether a time period has expired (e.g., time period of 30 minutes, one hour and/or two hours). This detection of a time based period may be performed autonomously. If a failure is detected, the frequency selection, which is described above with regard to the second step, and/or the coding selection, which is described above with regard to the third step, may be performed.

Sixth, the acoustic tones may be determined for the network using diagnostic telemetry data. By example, the acoustic tones may include determining selected modes of compression wave, shear wave, or any combination thereof. This determination may be performed in the testing unit and the communication nodes may be configured, particularly the transducers, to adjust between the different acoustic modes.

Seventh, the network configuration may then be used to collect data (e.g., wellbore data) and/or perform hydrocarbon operations. By way of example, the hydrocarbon operations may include managing the communications for the wellbore through the communication nodes by utilizing the tubular members, such as drilling string and/or casing.

In certain configurations, the network configuration may include various settings for communication nodes. The determination of the settings for the communication node may be based on modeling that involves performing calculations of equations for acoustic waveguide theory and modeling communication nodes disposed within the testing unit (e.g., a small scale above grade unit). Each communication node may be configured to form a communication pair with another communication node. The settings for each communication node may be different, as each pair of communication nodes may utilize different acoustic frequency bands and/or individual frequencies, and/or coding or decoding method for the communication nodes.

The present techniques include a configuration that may utilize communication nodes that are low-frequency communication nodes and/or high-frequency communication nodes. The different communication nodes may be utilized to provide enhancements to the operation of hydrocarbon operations. By way of example, the communication nodes may include using low frequency communication nodes for locations that do not involve sensing (e.g., in an uncompleted vertical section). The low-frequency communication nodes may involve a low frequency, long range telemetry system that may be utilized for optimal performance with low system complexity. The high-frequency communication nodes may be used for locations that involve sensing (e.g., near completions or zones of interest). The high-frequency communication nodes may involve a higher frequency as compared to a low frequency used by the low-frequency communication nodes.

Accordingly, the present techniques may enhance the hydrocarbon operations through the use specific configuration of communication nodes in a network. For example, in one or more embodiments, a method for communicating data among a plurality of communication nodes is described. The method comprising: obtaining data for a system; creating a communication network based on the obtained data, wherein the communication network includes a plurality of communication nodes, wherein the creation of the communication network comprises selecting one of one or more frequency bands, one or more individual tones, one or more coding methods, and any combination thereof; modeling the communication network in a testing unit to obtain diagnostic telemetry data; configuring the communication network at least partially based on the diagnostic telemetry data; installing the communication network associated with the system; and communicating between the plurality of communication nodes to perform operations for the system.

In one configuration, a method for communicating data among a plurality of communication nodes is described. The method comprising: obtaining data for a system; creating a communication network based on the obtained data, wherein the communication network includes a plurality of communication nodes, wherein the creation of the communication network comprises selecting one of one or more frequency bands, one or more individual tones, one or more coding methods, and any combination thereof; modeling the communication network in a testing unit to obtain diagnostic telemetry data; configuring the communication network at least partially based on the diagnostic telemetry data; installing the communication network with the system; and communicating between the plurality of communication nodes to perform operations.

In other configurations, the method may include one or more enhancements. The method may further comprise communicating between the plurality of communication nodes based on multiple frequency shift keying telemetry; may further comprise adjusting frequencies used in the multiple frequency shift keying telemetry based on the modeling in the testing unit; wherein the adjusting frequencies used in multiple frequency shift keying telemetry may comprise adjusting amplitudes of exchanged signals between a pair of communication nodes in the plurality of communication nodes; wherein the adjusting frequencies used in multiple frequency shift keying telemetry may comprise adjusting signal strength of exchanged signals between a pair of communication nodes in the plurality of communication nodes; may further comprise: obtaining measurements from one or more of the plurality of communication nodes, wherein the plurality of communication nodes are disposed along one or more tubular members, and performing hydrocarbon operations with the obtained measurements; wherein the modeling of the communication network in the testing unit may comprise disposing each of the plurality of communication nodes along one of one or more test tubular members in the testing unit and the plurality of communication nodes are spaced apart along the one or more test tubular members at a distance of at least one foot, at a distance in a range between 1 foot and 20 feet, or at a distance in a range between 2.5 feet and 5 feet; wherein the communicating between the plurality of communication nodes may comprise exchanging low-frequency signals that are less than or equal to ($\leq$) 20 kilohertz or in the range between 100 hertz and 20 kilohertz; wherein the communicating between the plurality of communication nodes may comprise exchanging high-frequency signals that are greater than ($>$) 20 kilohertz or in the range between greater than 20 kilohertz and 1 megahertz; wherein a first set of the plurality of communication nodes may be disposed in unmonitored sections of a wellbore and a second set of the plurality of communication nodes may be disposed in monitored sections of the wellbore; may further comprise: i) monitoring the communication network for an event; ii) modifying the communication network if the event is detected; and iii) continuing the communicating between the plurality of communication nodes if the event is not detected; and iv) repeating steps i) to iii) until the hydrocarbon operations are complete; wherein the event is a failure of the communication network to operate properly along the one or more tubular members; wherein the event is detection of a change in an acoustic environment along the one or more tubular members; wherein the event is the lapsing of a time period without successfully decoding a received communication; may further comprise adjusting the one or more coding methods if the event is detected; wherein the modifying the communication network may further comprise dynamically adjusting one of operation frequency bands, digital coding methods, and any combination thereof; wherein the data may be associated with equipment installed within the wellbore and the configuration of the wellbore equipment;

wherein the selection of one or more coding methods may further comprise determining a set of clock ticks for communication between communication nodes; wherein the coding method may comprise performing frequency combining with two or more clock ticks per tone in communication between communication nodes; and/or may further comprise adjusting the configuration of the communication nodes in the communication network at least partially based on the acoustic media to change the one or more frequency bands.

In another configuration, a system for modeling communications between a plurality of communication nodes is described. The system may comprising: a testing unit comprising: a housing with an interior region formed by the housing; one or more tubular members disposed within the housing; and a communication network disposed within the housing, wherein each of a plurality of communication nodes are disposed along the one or more tubular member and spaced apart along the one or more tubular members at a distance greater than one foot, and wherein the communication network comprises selecting one of one or more frequency bands, one or more individual tones, one or more coding methods, and any combination thereof.

In other configurations, the system may include one or more enhancements. The system may further comprise: wherein the plurality of communication nodes is configured to exchange data using multiple frequency shift keying telemetry; wherein the communication network in the testing unit may comprise each of the plurality of communication nodes are disposed along the one or more tubular members and the plurality of communication nodes are spaced apart along the one or more tubular members at a distance of at least one foot or at a distance in a range between 2.5 feet and 5 feet; wherein the plurality of communication nodes may be configured to exchange low-frequency signals that are less than or equal to ($\leq$) 20 kilohertz; wherein the plurality of communication nodes may be configured to exchange low-frequency signals that are in the range between 100 hertz and 20 kilohertz; wherein the plurality of communication nodes are configured to exchange high-frequency signals that are greater than ($>$) 20 kilohertz or in the range between greater than 20 kilohertz and 1 megahertz; may further comprise each of the plurality of communication nodes are configured to: i) monitor the communication network for an event; ii) modify the communication network if the event is detected; and iii) provide a notification if the event is detected; wherein the selection of one or more coding methods may further comprise determining a set of clock ticks for communication between communication nodes; wherein the coding method may comprise performing frequency combining with two or more clock ticks per tone in communication between communication nodes; and/or may further comprise adjusting the configuration of the communication nodes in the communication network at least partially based on the acoustic media to change the one or more frequency bands.

In yet other configurations, a method for communicating data among communication nodes within a wellbore is described. The method comprising: obtaining well data for a subsurface region; creating a communication network (e.g., wireless network) based on the obtained well data, wherein the wireless network includes a plurality of communication nodes; modeling the wireless network in the testing unit; obtaining relevant diagnostic telemetry data from a testing unit; installing the wireless network into the wellbore; dynamically adjusting operation frequency bands and/or digital coding methods for the communication system within the wellbore from downhole diagnostic telemetry data; and communicating between the plurality of communication nodes within the wellbore to perform hydrocarbon operations or to obtain wellbore data.

Further configurations may include a system for modeling communications between communication nodes. The system comprising: a testing unit comprising: a housing with an interior region formed by the housing; one or more tubular members disposed within the housing; a wireless network disposed within the housing, wherein each of a plurality of communication nodes are disposed along the one or more tubular member and spaced apart along the one or more tubular members at a distance in a range between 1 foot and 1,000 feet.

In yet other configurations, the method may include various enhancements. For example, the method may include obtaining measurements from one or more of the plurality of communication nodes along a tubular member (e.g., in the wellbore), and performing hydrocarbon operations with the obtained measurements; wherein the modeling the wireless network in the testing unit comprises disposing each of the plurality of communication nodes along a tubular member in the testing unit and spaced apart along the tubular member at a distance of at least one foot, in a range between 1 foot and 20 feet, in a range between 2.5 feet and 5 feet; wherein the communicating between the plurality of communication nodes within the wellbore to perform hydrocarbon operations or collect wellbore data comprises exchanging low-frequency signals are less than or equal to ($\leq$) 20 kHz or in the range between 100 Hz and 20 kHz; wherein the communicating between the plurality of communication nodes within the wellbore to perform hydrocarbon operations and/or collect wellbore data comprises exchanging high-frequency signals that are greater than ($>$) 20 kilohertz or in the range between greater than 20 kilohertz and 1 megahertz; wherein a first set of the plurality of communication nodes are disposed in unmonitored sections of the wellbore and a second set of the plurality of communication nodes are disposed in monitored sections of the wellbore. Further, the method may further comprise: i) monitoring the wireless network for an event; ii) modifying the wireless network if an event is detected; and iii) continuing the communicating between the plurality of communication nodes within the wellbore to perform hydrocarbon operations and/or wellbore data collection if an event is not detected; and iv) repeating steps i) to iii) until the hydrocarbon operations and/or wellbore data collection are complete; wherein the event is a failure of the wireless network to operate properly within the wellbore; wherein the event is detection of a change in an acoustic environment within the wellbore and/or wherein the event is the lapsing of a time period.

In another configuration, a system for modeling communications between a plurality of communication nodes is described. The system comprising: a testing unit comprising: a housing with an interior region formed by the housing; one or more tubular members disposed within the housing, a wireless network disposed within the housing, wherein each of a plurality of communication nodes are disposed along the one or more tubular member and spaced apart along the one or more tubular members at specific distances (e.g., in a range between 1 foot and 1,000 feet or in a range about 100 feet to about 500 feet).

In other configurations, other devices may be used along the tubular member, such as within the wellbore or within a pipeline. For example, the other devices may include hydrophones and/or other wired tools, which may be disposed inside the wellbore. The hydrophones and/or other wired tools may be utilized to exchange data (e.g., operational data) with communication nodes. The other devices may be configured to receive signals at frequencies less than 200 kHz, less than 100 kHz, or less than 20 kHz. These low-frequency devices may be disposed within different zones of the wellbore or along a wireline, which may be utilized within the respective zones to communicate with a downhole network. These devices may also or alternately operate at high frequencies. Similarly, the communication nodes may be configured to receive communication signals from a communication device, such as a pig within a pipeline or subsea conduit, transmitting in a lower frequency band (e.g., to provide longer range communications) without involving reconfiguration of any network devices, such as the communication nodes. The pig, which may be used to clean the interior of the pipeline, may be moved within the pipeline and configured to communicate with the various communication nodes associated with the pipeline.

Beneficially, the present techniques provide various enhancements to the hydrocarbon operations. The present techniques may utilize above grade testing and verification of the communication nodes to enhance hydrocarbon operations. The network may be utilized to provide reliable long range communication in various downhole environments. The present techniques may provide a network at lower costs and complexities based on the configuration, which may include using a lesser number of communication nodes for desired coverage range. Further, the present techniques may enhance the hydrocarbon operations by improving data rates and reducing data latency. Accordingly, the present techniques may be further understood with reference to FIGS. 1 to 8, which are described further below.

FIG. 1 is a schematic representation of a well 100 configured that utilizes a network having the proposed configuration of communication nodes. The well 100 includes a wellbore 102 that extends from surface equipment 120 to a subsurface region 128. Wellbore 102 also may be referred to herein as extending between a surface region 126 and subsurface region 128 and/or as extending within a subterranean formation 124 that extends within the subsurface region. The wellbore 102 may include a plurality of tubular sections, which may be formed of carbon steel, such as a casing or liner. Subterranean formation 124 may include hydrocarbons. The well 100 may be a hydrocarbon well, a production well, and/or an injection well.

Well 100 also includes an acoustic wireless network. The acoustic wireless network also may be referred to herein as a downhole acoustic wireless network that includes various communication nodes 114 and a topside communication node and/or control unit 132. The communication nodes 114 may be spaced-apart along a tone transmission medium 130 that extends along a length of wellbore 102. In the context of well 100, the tone transmission medium 130 may include a downhole tubular 110 that may extend within wellbore 102, a wellbore fluid 104 that may extend within wellbore 102, a portion of subsurface region 128 that is proximal wellbore 102, a portion of subterranean formation 124 that is proximal wellbore 102, and/or a cement 106 that may extend within wellbore 102 and/or that may extend within an annular region between wellbore 102 and downhole tubular 110. Downhole tubular 110 may define a fluid conduit 108.

Communication nodes 114 may include one or more encoding components 116, which may be configured to generate an acoustic tone, such as acoustic tone 112, and/or to induce the acoustic tone within tone transmission medium 130. Communication nodes 114 also may include one or more decoding components 118, which may be configured to receive acoustic tone 112 from the tone transmission medium. The communication nodes 114 may function as both an encoding component 116 and a decoding component 118 depending upon whether the given node is transmitting an acoustic tone (e.g., functioning as the encoding component) or receiving the acoustic tone (e.g., functioning as the decoding component). The communication nodes 114 may include both encoding and decoding functionality, or structures, with these structures being selectively utilized depending upon whether or not the given communication node is encoding the acoustic tone or decoding the acoustic tone. In addition, the communication nodes 114 may include sensing components that are utilized to measure, control, and monitor conditions within the wellbore 102.

In wells 100, transmission of acoustic tone 112 may be along a length of wellbore 102. As such, the transmission of the acoustic tone is substantially axial along the tubular member, and/or directed, such as by tone transmission medium 130. Such a configuration may be in contrast to more conventional wireless communication methodologies, which generally may transmit a corresponding wireless signal in a plurality of directions, or even in every direction.

The communication nodes 114, which are discussed in more detail herein, are disclosed in the context of well 100, such as a hydrocarbon well. However, it is within the scope of the present disclosure that these methods may be utilized to communicate via an acoustic tones in any suitable network, such as any acoustic wireless network. As examples, the communication network may be used in a subsea well and/or in the context of a subsea tubular member that extends within a subsea environment. Under these conditions, the tone transmission medium may include, or be, the subsea tubular member and/or a subsea fluid that extends within the subsea environment, proximal to the subsea tubular member, and/or within the subsea tubular member. As another example, the communication network in the context of a surface tubular that extends within the surface region. Under these conditions, the tone transmission medium may include, or be, the surface tubular member and/or a fluid that extends within the surface region, proximal to the surface tubular member, and/or within the surface tubular member.

The plurality of frequencies, which are utilized in the communication nodes 114, may include the first frequency for a first type of communication node type and/or a second frequency for a second type of communication node type. Each of the wireless network types may be utilized in different configurations to provide the communication for the hydrocarbon operations. The respective frequency ranges may be any suitable values. As examples, each frequency in the plurality of high-frequency ranges may be at least 20 kilohertz (kHz), at least 25 kHz, at least 50 kHz, at least 60 kHz, at least 70 kHz, at least 80 kHz, at least 90 kHz, at least 100 kHz, at least 200 kHz, at least 250 kHz, at least 400 kHz, at least 500 kHz, and/or at least 600 kHz. Additionally or alternatively, each frequency in the plurality of high-frequency ranges may be at most 1000 kHz (1 megahertz (MHz)), at most 800 kHz, at most 750 kHz, at most 600 kHz, at most 500 kHz, at most 400 kHz, at most 200 kHz, at most 150 kHz, at most 100 kHz, and/or at most 80 kHz. Further, each frequency in the low-frequency ranges may be at least 20 hertz (Hz), at least 50 Hz, at least 100 Hz, at least 150 Hz, at least 200 Hz, at least 500 Hz, at least 1 kHz, at least 2 kHz, at least 3 kHz, at least 4 kHz, and/or at least 5 kHz. Additionally or alternatively, each frequency in the high-frequency ranges may be at most 10 kHz, at most 12 kHz, at most 14 kHz, at most 15 kHz, at most 16 kHz, at most 17 kHz, at most 18 kHz, and/or at most 20 kHz.

Figure 2A:
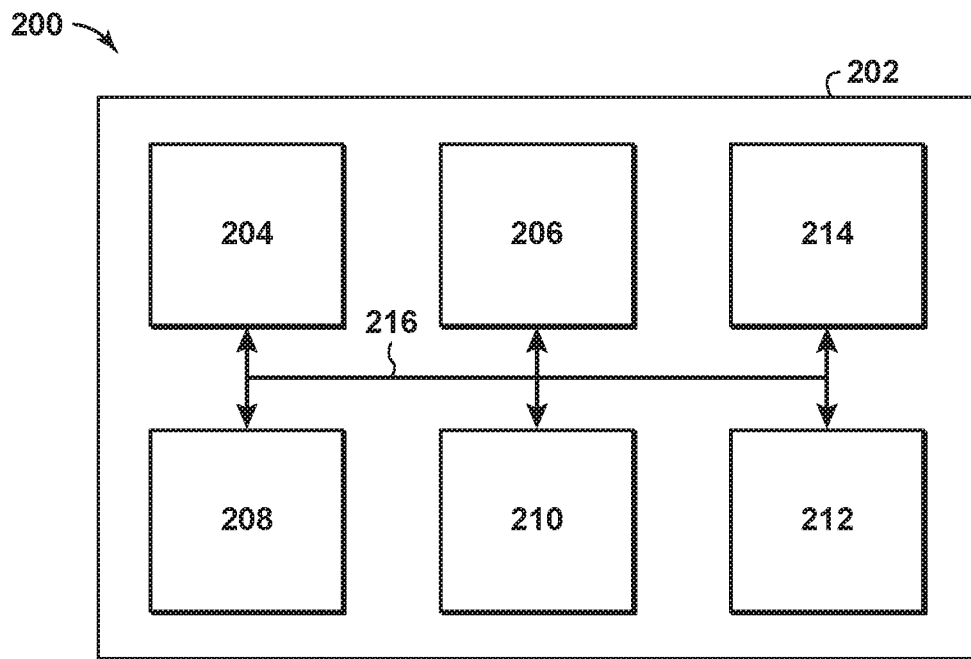
FIGS. 2A and 2B are exemplary views of communications nodes of FIG. 1.
Figure 2B:
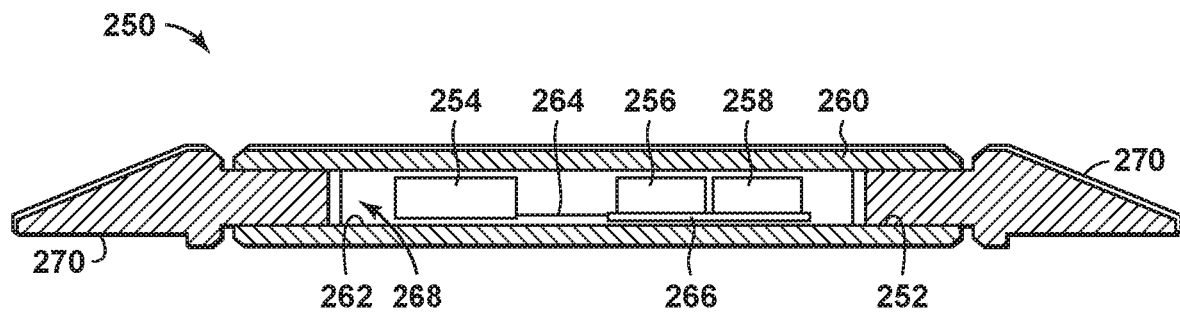

The communication nodes 114 may include various configurations, such as those described in FIGS. 2A and 2B. The communications node may be disposed on a conduit and/or a tubular section within the wellbore. The communication nodes may be associated with equipment, may be associated with tubular members and/or may be associated with the surface equipment. The communication nodes may also be configured to attach at joints, internal or external surfaces of conduits, surfaces within the wellbore, or to equipment.

As a specific example, the communications nodes may be structured and arranged to attach to the surface (e.g., internal or external surface) of conduits at a selected location. This type of communication node may be disposed in a wellbore environment as an intermediate communications node between the surface and any communication nodes associated with the equipment and/or sensors. The communication nodes may be disposed on each tubular member, or may be disposed on alternative tubular members. By way of example, the communications node may be welded onto the respective surface or may be secured with a fastener to the tubular member (e.g., may be selectively attachable to or detachable from tubular member). The fastener may include the use of clamps (not shown), an epoxy or other suitable acoustic couplant may be used for chemical bonding. By attaching to the external surface of the tubular member, the communication nodes may not interfere with the flow of fluids within the internal bore of the tubular section.

FIG. 2A is a diagram 200 of an exemplary communication node. The communication node 200 may include a housing 202 along with a central processing unit (CPU) 204, memory 206, which may include instructions or software to be executed by the CPU 204 one or more encoding components 208, one or more decoding components 210, a power component 212 and/or one or more sensing components 214, which communicate via a bus 216. The central processing unit (CPU) 204 may be any general-purpose CPU, although other types of architectures of CPU 204 may be used as long as CPU 204 supports the inventive operations as described herein. The CPU 204 may contain two or more microprocessors and may be a system on chip (SOC), digital signal processor (DSP), application specific integrated circuits (ASIC), and field programmable gate array (FPGA). The CPU 204 may execute the various logical instructions according to disclosed aspects and methodologies. For example, the CPU 204 may execute machine-level instructions for performing processing according to aspects and methodologies disclosed herein. The memory 206 may include random access memory (RAM), such as static RAM (SRAM), dynamic RAM (DRAM), synchronous DRAM (SDRAM), or the like, read-only memory (ROM), such as programmable ROM (PROM), erasable PROM (EPROM), electronically erasable PROM (EEPROM), or the like. In addition, the memory 206 may include NAND flash and/or NOR flash. Further, the power component 212 may be disposed in the housing 202 and may be configured to provide power to the other components. The power component 212 may include one or more batteries.

To manage the communications, the communication node 200 may utilize the one or more encoding components 208 and one or more decoding components 210 within the housing 202. The encoding components 208, which may include one or more transducers, may be disposed within the housing 202 and may be configured to generate an acoustic tones and/or to induce the acoustic tone on a tone transmission medium. The one or more decoding components 210, which may include one or more transducers, may be disposed within the housing 202 and may be configured to receive acoustic tones from the tone transmission medium. The encoding and decoding components 208 and 210 may include instructions stored in memory and utilized to perform the generation of the acoustic tones or decoding of the acoustic tones along with compression or decompression of the data packets into the acoustic tones. The encoding component 208 and decoding component 210 may utilize the same transducer in certain configurations.

The one and/or more sensing components 214 may be configured to obtain sensing data and communicate the obtained measurement data to other communication nodes. By way of example, the sensing components 214 may be configured to obtain pressure measurements, temperature measurements, fluid flow measurements, vibration measurements, resistivity measurements, capacitance measurements, strain measurements, acoustics measurements, stimulation and/or hydraulic fracture properties measurements, chemicals measurements, position measurements and other suitable measurements.

In yet another exemplary configuration, FIG. 2B is an exemplary cross sectional diagram of a communications node 250 that may be used in the system. The view of the communications node 250 is along the longitudinal axis. The communications node 250 includes a housing 252, which may be fabricated from carbon steel or other suitable material to avoid corrosion at the coupling. The housing 252 is dimensioned to provide sufficient structural strength to protect internal components and other electronics disposed within the interior region. By way of example, the housing 252 has an outer wall 260, which may be about 0.2 inches (0.51 centimeters (cm)) in thickness. A cavity 262 houses the electronics, including, by way of example and not of limitation, a power source 254 (e.g., one or more batteries), a power supply wire 264, a first electro-acoustic transducer 256, a second electro-acoustic transducer 258, and a circuit board 266. The circuit board 266 may preferably include a micro-processor or electronics module that processes acoustic signals.

For communication between communication nodes, the first transducer 256 and the second transducer 258, which may each be electro-acoustic transducers, are provided to convert acoustical energy to electrical energy (or vice-versa) and are coupled with outer wall 260 on the side attached to the tubular member. As an example, the first transducer 256, which may be configured to receive acoustic signals, and a second transducer 258, which may be configured to transmit acoustic signals, are disposed in the cavity 262 of the housing 252. The first and second transducers 256 and 258 provide a mechanism for acoustic signals to be transmitted and received from node-to-node, either up the wellbore or down the wellbore. In certain configurations, the second electro-acoustic transducer 258, configured to serve as a transmitter, of intermediate communications nodes 250 may also produce acoustic telemetry signals. Also, an electrical signal is delivered to the second transducer 258 via a driver circuit. By way of example, a signal generated in one of the transducers, such as the second transducer 258, passes through the housing 252 to the tubular member, and propagates along the tubular member to other communications nodes. As a result, the transducers that generates or receives acoustic signals may be a magnetostrictive transducer (e.g., including a coil wrapped around a core) and/or a piezoelectric ceramic transducer. Regardless of the specific type of transducer, the electrically encoded data are transformed into a sonic wave that is carried through the walls of a tubular member in the wellbore. In certain configurations, a single transducer may serve as both the transmitter and receiver.

Further, the internals of communications nodes 250 may include a protective layer 268. The protective layer 268 resides internal to the wall 260 and provides an additional thin layer of protection for the electronics. This protective layer provides additional mechanical durability and moisture isolation. The intermediate communications nodes 250 may also be fluid sealed with the housing 252 to protect the internal electronics. One form of protection for the internal electronics is available using a potting material.

To secure the communication node to the tubular member, the intermediate communications nodes 250 may also optionally include a shoe 270. More specifically, the intermediate communications nodes 250 may include a pair of shoes 270 disposed at opposing ends of the wall 260. Each of the shoes 270 provides a beveled face that helps prevent the node 250 from hanging up on an external tubular body or the surrounding earth formation, as the case may be, during run-in or pull-out.

To enhance the performance, the communication nodes may be configured to manage different types of wireless networks. For example, a communication node may be configured to operate with different types of networks and may use different frequencies to exchange data, such as low frequencies, high frequencies and/or radio frequencies. Accordingly, the communication nodes may be configured to communicate with each of the types of communication networks and/or may be configured to transmit with one type of communication network and receive with another type of communication network. In certain configurations, the acoustic waves may be communicated in asynchronous packets of information comprising various separate tones. In other configurations, the acoustic telemetry data transfer may involve multiple frequency shift keying (MFSK). Any extraneous noise in the signal is moderated by using well-known analog and/or digital signal processing methods. This noise removal and signal enhancement may involve conveying the acoustic signal through a signal conditioning circuit using, for example, one or more bandpass filters.

As may be appreciated, the method may include recycling to select and optimize the MFSK frequencies, selection of frequency bands, individual tones and/or coding methods. In particular, the method may include determining frequency selection, which may include using a testing unit above grade; dynamically processing above grade and/or downhole; determining preferential coding methods available as a result of profiling; determining clock ticks selection by frequency combining; and/or changing the acoustic media results in different bands. The methods may include disposing communication nodes inside tubular members and/or outside tubular members. In other configurations, the communication nodes may be with other communication nodes, such as one or more hydrophones in a wellbore or one or more pigs in a pipeline.

Figure 3:
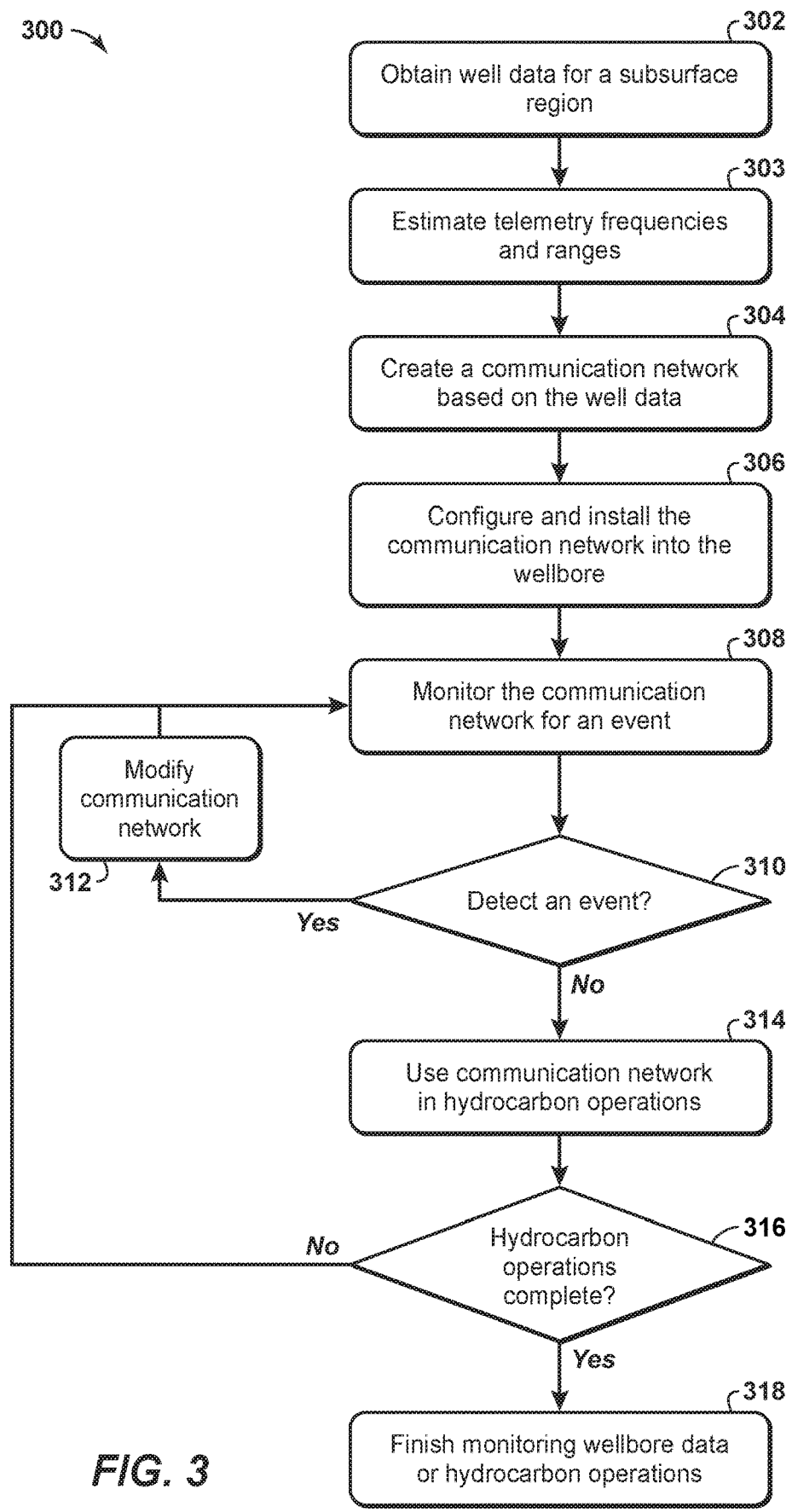
FIG. 3 is an exemplary flow chart in accordance with an embodiment of the present techniques.

FIG. 3 is an exemplary flow chart 300 in accordance with an embodiment of the present techniques. The flow chart 300 is a method for creating, installing and using a communication network for a wellbore. The method may include creating a communication network and install the communication network in a wellbore, as shown in blocks 302 to 306. Then, the communication network may be monitored and hydrocarbon operations are performed, as shown in blocks 308 to 318.

To begin, the method involves creating, installing and using a wireless network for a wellbore, as shown in blocks 302 to 306. At block 302, well data for a subsurface region is obtained. The well data may include seismic data, electromagnetic data, resistivity data, gravity data, well log data, core sample data, and combinations thereof. The well data may be obtained from memory or from the equipment in the wellbore. The well data may also include the data associated with the equipment installed within the wellbore and the configuration of the wellbore equipment and/or hardware capabilities. For example, the well data may include the composition of the tubular members, thickness of the tubular members, length of the tubular members, fluid composition within the wellbore, formation properties, cementation within the wellbore and/or other suitable properties associated with the wellbore.

Based on the well data, such as the hardware capabilities, telemetry frequencies and ranges are estimated at block 303. Both modeling and historical experience provides an estimate for the frequency ranges including the preferred tonal frequency separation. The tonal frequencies may not have to be equally spaced. The frequency range bandwidth may be constrained by both the acoustics of the channel and the capability of the transmission and reception electronics, including transmit and receive transducers. Likewise, the frequency spacing of the MFSK tones may be constrained by the tonal purity of the transmitted tone and resolution of the receiver decoder.

At block 304, a communication network is created on a testing unit based on the well data. By way of example, each of the communication nodes may be disposed along one or more tubular members in the testing unit and spaced apart along the tubular member at a distance of at least one foot, may be in a range between 1 foot and 20 feet, in a range between 2 feet and 10 feet, or in a range between 2.5 feet and 5 feet. At block 304, a communication network is created in the testing unit based on the well data. The creation of the communication network may include selecting acoustic frequency band and individual frequencies; optimizing the acoustic communication band for each pair of communication nodes; determining coding method for the network and/or determining selective modes for the network. Further, the communication network may be configured to manage different wireless network types. For example, a communication node may be configured to operate with different wireless network types, such as low frequency, high frequency and/or radio frequency. The creation of the communication network may include performing a simulation with a configuration of communication nodes, which may include modeling specific frequencies and/or use of certain wireless communication node types within specific zones or segments of the wellbore. The simulation may include modeling the tubular members, the communication of signals between communication nodes and/or other aspects. The simulation results may include the computation of time-varying fluid pressure and fluid compositions and the prediction of signal travel times within the wellbore. Performing the simulation may also include modeling fluid, modeling signal transmissions and/or structural changes based on the network. In addition, the creation of the wireless network may include installing and configuring the communication nodes in the wireless network in a testing unit. The testing unit may be a system that includes one or more tubular members and the associated communication nodes distributed along the tubular members within a housing of the testing unit. The testing unit may also contain a fluid disposed around the tubular member within the housing. The modeling may include theoretical work based on acoustic waveguide theory and/or a scale above grade lab system tests.

Then, the communication network is configured and installed into the wellbore, as shown in block 306. The installation of the network may include disposing the communication nodes within the wellbore, which may be secured to tubular members. The installation of the communication network, which may include one or more wireless networks, may include verification of the communication network by performing testing and/or verification of the communication nodes in the proposed network configuration, which is installed in the testing unit.

Then, the communication network may be monitored and hydrocarbon operations may be performed, as shown in blocks 308 to 318. At block 308, the communication network is monitored for an event. The event may involve situations when the communication network fails to operate properly, which may be detected by as a local failure; a change in the acoustic environment; a manual trigger and/or a time based period has been reached. The monitoring of the communication network may include determining the status of the data packets exchanged between the communication nodes. At block 310, a determination is made whether an event has been detected. The determination may include determining whether a notification has been indicated. If an event has been detected, the communication node may be modified, as shown by block 312. The modification of the network may include performing one or more selecting acoustic frequency band and individual frequencies; optimizing the acoustic communication band for each pair of communication nodes; determining coding and/or decoding method for the network and/or determining selective modes for the communication network. The modification of the communication network may include adding communication nodes, adjusting the location of communication nodes, and/or adjusting the types of wireless networks of communication nodes utilized at one or more zones of the wellbore.

If an event is not detected, the communication network is used in hydrocarbon operations, as shown in block 314. The communication network may be used in hydrocarbon operations. The hydrocarbon operations may include hydrocarbon exploration operations, hydrocarbon development operations, collection of wellbore data, and/or hydrocarbon production operations. For example, the communication network may be used to estimate well performance prediction. As another example, the communication network may be used to adjust hydrocarbon production operations, such as installing or modifying a well or completion, modifying or adjusting drilling operations and/or installing or modifying a production facility. Further, the results may be utilized to predict hydrocarbon accumulation within the subsurface region; to provide an estimated recovery factor; adjust perforation operations and/or to determine rates of fluid flow for a subsurface region. The production facility may include one or more units to process and manage the flow of production fluids, such as hydrocarbons and/or water, from the formation.

Then, at block 316, a determination is made whether the hydrocarbon operations are complete. If the monitoring and communications with hydrocarbon operations are not complete, the network is continued to be monitored for an event, as shown in block 308. If the monitoring and communications with hydrocarbon operations are complete, the network telemetry may be finished, as shown in block 318. The finishing of the hydrocarbon operations may involve shutting down network telemetry operations or reconfiguring the communication network for a different activity.

Beneficially, the method provides an enhancement in the production, development, and/or exploration of hydrocarbons. In particular, the method may be utilized to enhance communication within the wellbore by providing a specific configuration that optimizes communication. Further, the enhanced communications may involve less computational effort, may involve less interactive intervention, and/or may be performed in a computationally efficient manner. As a result, this may provide enhancements to production at lower costs and lower risk.

As may be appreciated, the blocks of FIG. 3 may be omitted, repeated, performed in a different order, or augmented with additional steps not shown. Some steps may be performed sequentially, while others may be executed simultaneously or concurrently in parallel. In addition, while FIG. 3 describes the communication network within a wellbore, the method may also be performed along one or more tubular members, such as along a subsea conduit and/or along a pipeline, to enhance associated operations. As a specific example, the communication network may be used along midstream pipelines and storage tanks, and/or the downstream refinery and distribution operations.

Figure 4:
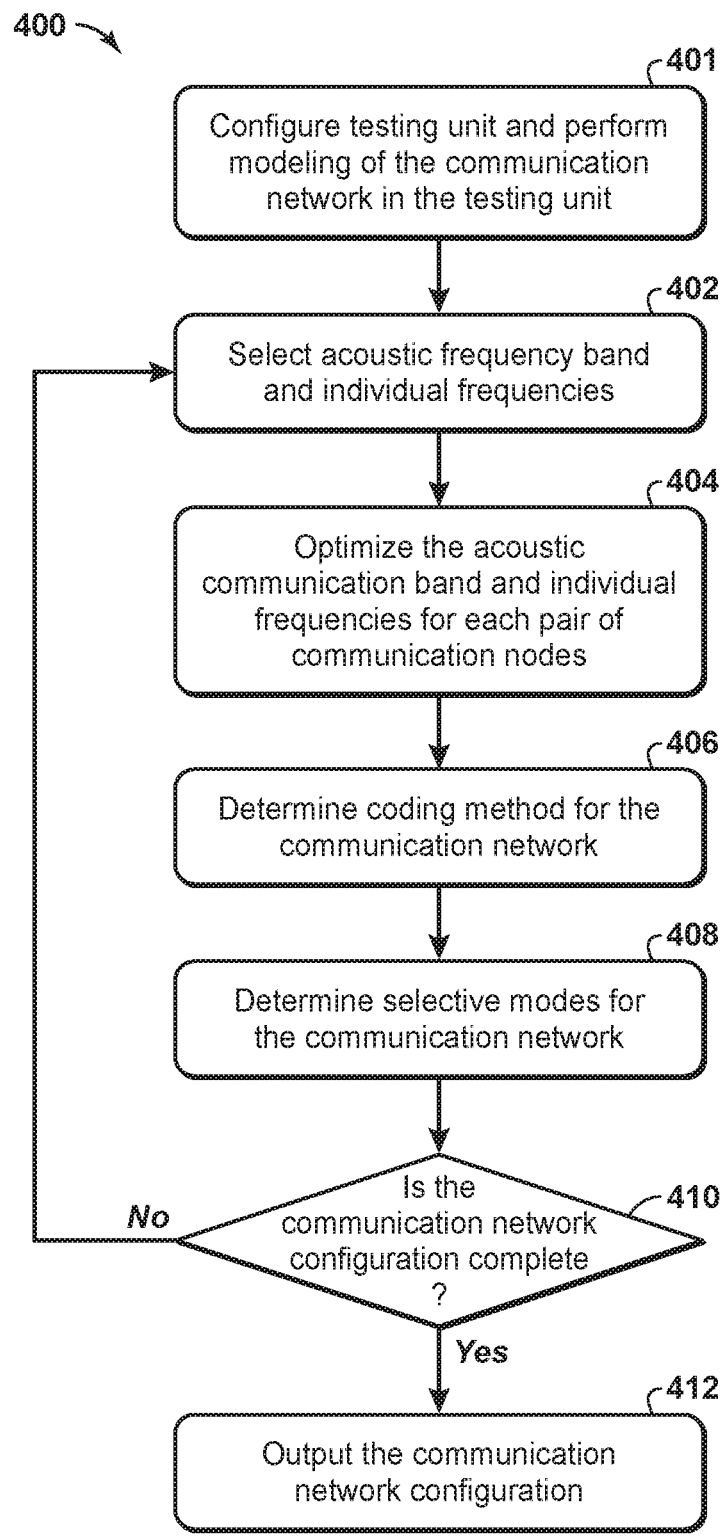
FIG. 4 is an exemplary flow chart in accordance with an embodiment of the present techniques.

As noted in FIG. 3, the wireless network created in block 304 and modified in block 312 may involve performing various steps. By way of example, FIG. 4 is an exemplary flow chart 400 for an acoustic network in accordance with an embodiment of the present techniques. The flow chart 400 may include performing various steps, such as blocks 401 to 408, and then a determination is made whether the communication network configuration is complete and the communication network configuration is outputted, as shown in blocks 410 and 412.

To begin, the method involves performing various steps, as shown in blocks 401 to 408. At block 401, the testing unit may be configured and modeling the communication network in the testing unit. The configuration of the testing unit may include installing and configuring the communication nodes or comparable physical and/or electrical representations of the communication nodes in the communication network in the testing unit. The testing unit may include a housing that has one or more tubular members and the associated communication nodes distributed along and coupled to the tubular members disposed within a housing of the testing unit. The testing unit may also contain a fluid disposed around the tubular member within the housing. By way of example, the testing unit may include the same size casing without surrounding cement, (e.g., representing the tubular member) to pre-select an acoustic communication frequency band or individual frequencies for a system, such as a downhole system. The tubular members in the testing unit may be filled with water, air or any combination thereof to preselect the acoustic communication frequency band or individual frequencies. In other configurations, the testing unit may include dampening devices that are configured to model or represent additional distances on the tubular members. At block 402, the acoustic frequency band and individual frequencies is selected. The acoustic frequency band and individual frequencies may include each frequency in the plurality of high-frequency ranges, which may be at least 20 kilohertz (kHz), at least 25 kHz, at least 50 kHz, at least 60 kHz, at least 70 kHz, at least 80 kHz, at least 90 kHz, at least 100 kHz, at least 200 kHz, at least 250 kHz, at least 400 kHz, at least 500 kHz, and/or at least 600 kHz. Additionally or alternatively, each frequency in the plurality of high-frequency ranges may be at most 1,000 kHz (1 megahertz (MHz)), at most 800 kHz, at most 750 kHz, at most 600 kHz, at most 500 kHz, at most 400 kHz, at most 200 kHz, at most 150 kHz, at most 100 kHz, and/or at most 80 kHz. Further, each frequency in the low-frequency ranges may be at least 20 hertz (Hz), at least 50 Hz, at least 100 Hz, at least 150 Hz, at least 200 Hz, at least 500 Hz, at least 1 kHz, at least 2 kHz, at least 3 kHz, at least 4 kHz, and/or at least 5 kHz. Additionally or alternatively, each frequency in the high-frequency ranges may be at most 10 kHz, at most 12 kHz, at most 14 kHz, at most 15 kHz, at most 16 kHz, at most 17 kHz, at most 18 kHz, and/or at most 20 kHz. Then, at block 404, the acoustic communication band and individual frequencies for each pair of communication nodes may be optimized. The optimization may include determining the explicit MFSK frequencies. At block 406, the coding methods for the communication network may be determined. The coding method may include an encoding method and decoding method, which may be different from each other.

Within the frequency band, clock ticks can also be optimized to maximize data communication rate. For example, the coding method may be selected based on availability of frequency bands and/or communication rates may be compromised if the frequency band is limited. In certain configurations, the coding method may include performing frequency combining based on one or more clock ticks per tone (e.g., one clock tick per tone, two clock ticks per tone, three clock ticks per tone, and/or more clock ticks per tone) to achieve more or fewer tones within a frequency band. The frequency combining may involve using fewer clock ticks per tone to provide more tones with improved signal strength suitable for use with MFSK, which provides more digital bits conveyed per tone, which result in faster and more efficient communication (communicate more bits using fewer tones per packet with a corresponding energy savings). The minimum configuration may include one clock tick per tone. In other configurations, the frequency combining may involve using more clock ticks per tone to move the tones farther apart in frequency to compensate for poor acoustic propagation, excessive background noise, and similar issues, but may also result in fewer strong tones available for use with MFSK meaning slower communication and more tones per packet with a corresponding energy cost. With a sufficiently wide frequency band, enough strong tones may be used to compensate for using multiple clock ticks per tone.

At block 408, selective modes for the communication network may be determined. At block 410, a determination is made whether the communication network configuration is complete. The determination may include verifying the operation of the communication nodes in the communication networks. If the network configuration is not complete, various steps may be repeated. As shown in this flow chart 400, the selection of acoustic frequency band and individual frequencies may be performed, as shown by block 402. If the network configuration is complete, the network configuration may be outputted, as shown in block 412. The outputting of the network configuration may include storing the network configuration and/or displaying the network configuration.

As may be appreciated, the communication nodes may be configured with a setting or profile. The settings may include various parameters, such those of blocks 402, 404 and 406. The settings may include acoustic frequency band and individual frequencies (e.g., acoustic communication band and individual frequencies for each pair of communication nodes); and/or coding methods (e.g., establishing how many tones to use for MFSK (2, 4, 8, . . . ) and/or whether to use direct mapping or spread spectrum), and/or tone detection method, such as FFT, ZCR and other methods. The settings may include frequency combining using one or more clock ticks per tone. The tones may be selected to compensate for poor acoustic propagation.

Figure 6:
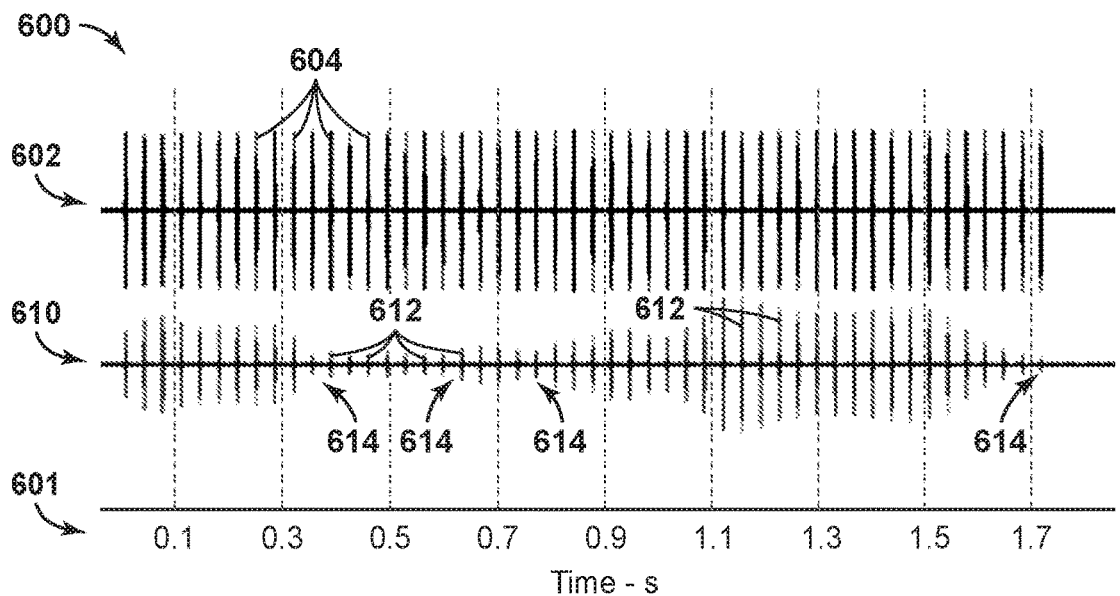
FIG. 6 is an exemplary diagram of variations of acoustic signals along a casing with each tone has one unique frequency.
Figure 7:
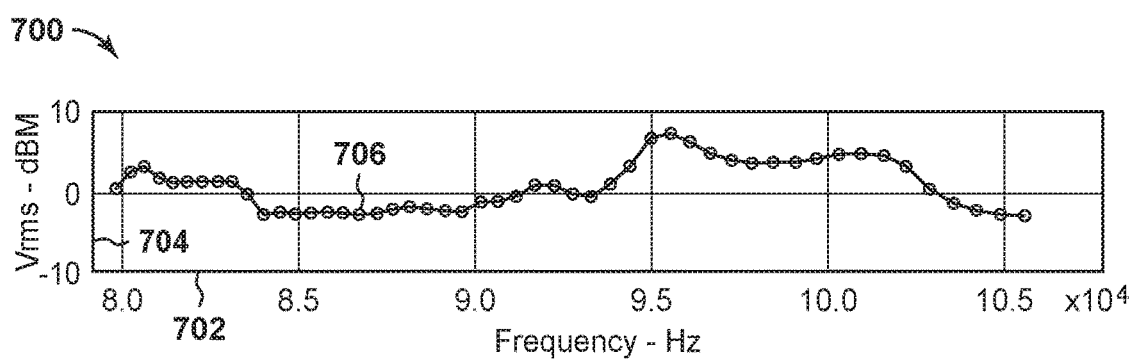
FIG. 7 is an exemplary diagram of acoustic signal amplitudes versus frequencies after propagation along a tubular member.

By way of example, the network may include transmitting acoustic signals as described further in FIGS. 5 to 7. For example, FIG. 5 is an exemplary diagram 500 of an of an acoustic communication signal used in a system. This diagram 500 includes a first tone 502 and a second tone 504, which may be repeated for subsequent tones. The tones may include various parameters that may be used in the communication network at each communication node. The parameters may include voltage or amplitude 510, ping time 512, a wait time 514, and frequency which may be a preset configuration. By way of example, the preset configuration may include values may be about 100 volts (V) for voltage or amplitude 510, 10 milliseconds (ms) for ping time 512 and 30 ms for waiting time 514.

FIG. 6 is an exemplary diagram 600 of variations of acoustic signals along a casing with each tone has one unique frequency. These signals include tones that are shown along a time axis 601 and respective amplitudes. The transmitted electrical tones 604 are provided from a transmitter of a communication node, as shown by chart 602. The received electrical tones 612 are received at a receiver in a communication node, as shown by chart 610. Of these received electrical tones 612, certain of the received electrical tones are weak in received amplitude, as shown by the received electrical tones 614. As an example, the weak received electrical tones 614 may be excluded in the set of optimized tones when a pair of nodes establishes their optimized set. Additionally, a threshold may be applied so the weak received electrical tones 614 may be excluded from the set of optimized tones.

FIG. 7 is an exemplary diagram 700 of acoustic signal amplitudes versus frequencies after propagation along a tubular member. In the diagram 700, the acoustic signal root-mean-square (RMS) amplitude is shown versus frequencies after propagation along a casing within a wellbore. The RMS computation is a mathematical technique that gives a meaningful amplitude for a time-varying signal, such as a sinusoid. In this diagram 700, the response 706 shown along an acoustic signal RMS amplitude axis 704 in Vrms (decibel-milliwatts (dBm), 0 dBm equal to (=) 1 milliwatts (mW)) versus a frequency axis 702 in hertz (Hz). As an example, the received acoustic signal RMS amplitudes below a threshold may be excluded in the set of optimized tones when a pair of nodes establishes their optimized set.

Figure 8:
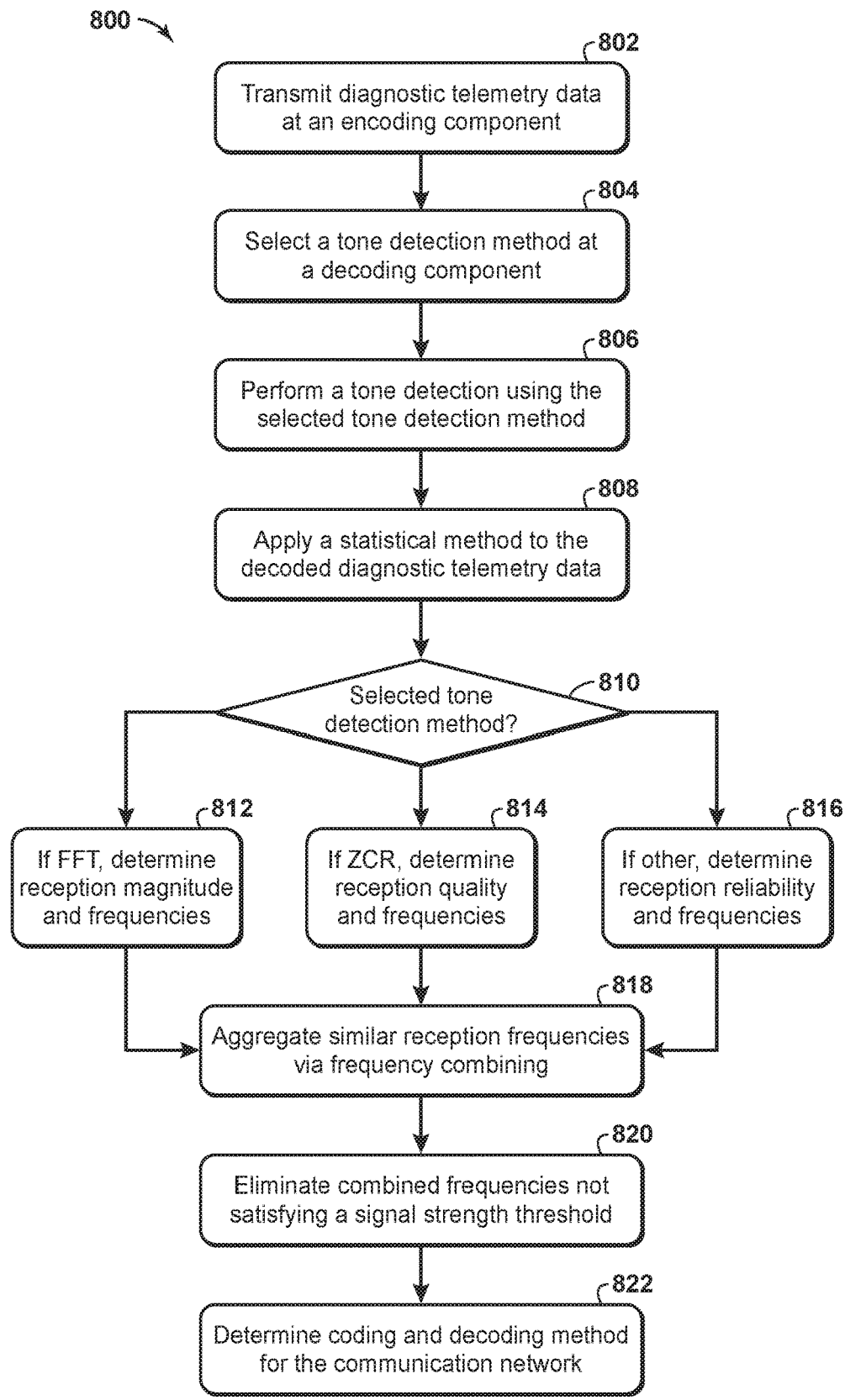
FIG. 8 is yet another exemplary flow chart in accordance with an embodiment of the present techniques.

FIG. 8 is yet another exemplary flow chart 800 in accordance with an embodiment of the present techniques. The flow chart 800 is a flow chart of a method for performing an acoustic communication band optimization, while selecting a tone detection method. The optimization may be a manual or automated activity that may occur, by way of example, during the installation of the network, at the beginning of a network activity, in response to an event, or in response to one or more other triggering conditions. The blocks within the flow chart 800 may be represented by blocks 402, 404 and 406. The method may include performing an acoustic communication band optimization, as shown in blocks 802 to 808. Then, a tone detection is selected, as shown in blocks 810 to 822.

To begin, the acoustic communication band optimization is determined, as shown in blocks 802 to 808. At block 802, the diagnostic telemetry data is transmitted at an encoding component. Then, at block 804, a tone detection method is selected at a decoding component. At block 806, a tone detection using the selected tone detection method is performed. At block 808, a statistical method to the decoded diagnostic telemetry data is applied.

Then, a tone detection is selected, as shown in blocks 810 to 822. At block 810, a determination is made for a tone detection method. The method for acoustic communication band optimization may be dependent on the selected tone detection method. If the selected tone detection method is FFT, the reception magnitude and frequencies are determined, as shown in 812. The determination may include identifying reception frequencies and the FFT magnitude for each reception frequency. If the selected tone detection method is ZCX, the reception quality and frequencies are determined in block 814. The determination may include identifying reception frequencies and the ZCX quality of each reception frequency. If the selected tone detection method is not FFT and not ZCX, the reception reliability and frequencies are determined. The determination may include identifying reception frequencies and the reliability of each reception frequency as assessed using a data analysis method judged suitable by a person skilled in the art.

Further, in blocks 818 to 822, the frequencies may be adjusted. At block 818, similar reception frequencies may be aggregated via frequency combining. The aggregation may involve combining similar reception frequencies by using frequency combining. The frequency combining may include dividing the range of possible reception frequencies into a number of sections and classifies all reception frequencies within any one band as occurrences of a single frequency. It may be apparent to a person skilled in the computational arts that the totality of possible reception frequencies may be excessively large, which may lead to an excessive degree of computational complexity inherent in analysis of the reception frequencies, and that frequency combining may limit the number of possibilities to reduce the computational complexity inherent in analysis of the possibilities to an acceptable level. Then, at block 820, the combined frequencies not satisfying (e.g., that fail to meet) a signal strength threshold may be eliminated. Signal strength may be determined based on FFT magnitude, ZCX quality, reception reliability, some other characteristic, and/or any combination thereof. The threshold may be based on a particular value or may be determined to eliminate a particular proportion of the combined frequencies. The combined frequencies not eliminated may represent the optimized acoustic communication band. At block 822, the coding and decoding method for the communication network may be determined. The determination may be based on the combined frequencies not eliminated. Examples of coding and decoding methods on the tones from the subset are: (i) direct mapping method; and (ii) spread spectrum methods. As an example, using an extremely weak acoustic channel, a single tone may be used in a direct mapping method for a communication band that includes a single frequency. As another example, using an extremely strong acoustic channel, a predetermined number of tones having optimal signal strength may be organized as an optimal arrangement of either spread spectrum or direct mapping, selected based on an optimal combination of high rate of communication, a low error rate, and/or low power consumption. This step may include use of diagnostic telemetry data.

By way of example, certain types of MFSK involve a certain number of tones, which may be in the powers of two: two, four, eight, sixteen, and continuing further. The comparison may involve ranking the strength of the tones and choosing a number of tones to provide the largest-possible power of two. In particular, if there are nineteen candidate tones, the comparison may involve maintaining the strongest sixteen candidate tone. Accordingly, using the MFSK using sixteen tones is equivalent to sending four digital bits per tone.

The results of the flow chart may be stored in the respective communication nodes as a setting. The communication network configuration may include settings for an acoustic communication band optimization method and/or selection of a tone detection method. Each of the communication nodes may include a specific setting or configuration, which may be configured to have each pair of communication nodes.

Persons skilled in the technical field will readily recognize that in practical applications of the disclosed methodology, it is partially performed on a computer, typically a suitably programmed digital computer or processor based device. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "processing" or "computing", "calculating", "comparing", "determining", "displaying", "copying," "producing," "storing," "adding," "applying," "executing," "maintaining," "updating," "creating," "constructing" "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the present techniques also relate to an apparatus for performing the operations herein. This apparatus, such as the control unit or the communication nodes, may be specially constructed for the required purposes, or it may comprise a general-purpose computer or processor based device selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), NAND flash, NOR flash, magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present techniques are in no way limited to implementation in any specific operating system or environment.

By way of example, the control unit may include a computer system that may be used to perform any of the methods disclosed herein. A central processing unit (CPU) is coupled to system bus. The CPU may be any general-purpose CPU, although other types of architectures of CPU (or other components of exemplary system) may be used as long as CPU (and other components of system) supports the inventive operations as described herein. The CPU may contain two or more microprocessors and may be a system on chip (SOC), digital signal processor (DSP), application specific integrated circuits (ASIC), and field programmable gate array (FPGA). The CPU may execute the various logical instructions according to disclosed aspects and methodologies. For example, the CPU may execute machine-level instructions for performing processing according to aspects and methodologies disclosed herein.

The computer system may also include computer components such as a random access memory (RAM), which may be SRAM, DRAM, SDRAM, or the like. The computer system may also include read-only memory (ROM), which may be PROM, EPROM, EEPROM, or the like. RAM and ROM, which may also include NAND flash and/or NOR flash, hold user and system data and programs, as is known in the art. The computer system may also include an input/output (I/O) adapter, a graphical processing unit (GPU), a communications adapter, a user interface adapter, and a display adapter. The I/O adapter, the user interface adapter, and/or communications adapter may, in certain aspects and techniques, enable a user to interact with computer system to input information.

The I/O adapter preferably connects a storage device(s), such as one or more of hard drive, compact disc (CD) drive, floppy disk drive, tape drive, etc. to computer system. The storage device(s) may be used when RAM is insufficient for the memory requirements associated with storing data for operations of embodiments of the present techniques. The data storage of the computer system may be used for storing information and/or other data used or generated as disclosed herein. The communications adapter may couple the computer system to a network (not shown), which may include the network for the wellbore and a separate network to communicate with remote locations), which may enable information to be input to and/or output from system via the network (for example, a wide-area network, a local-area network, a wireless network, any combination of the foregoing). User interface adapter couples user input devices, such as a keyboard, a pointing device, and the like, to computer system. The display adapter is driven by the CPU to control, through a display driver, the display on a display device.

The architecture of system may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

As may be appreciated, the method may be implemented in machine-readable logic, such that a set of instructions or code that, when executed, performs the instructions or operations from memory. By way of example, the computer system includes a processor; an input device and memory. The input device is in communication with the processor and is configured to receive input data associated with a subsurface region. The memory is in communication with the processor and the memory has a set of instructions, wherein the set of instructions, when executed, are configured to: perform certain operations. By way of example, the communication nodes may be configured to exchange low-frequency signals that are less than or equal to ($\leq$) 20 kilohertz; may be configured to exchange low-frequency signals that are in the range between 100 hertz and 20 kilohertz; may be configured to exchange high-frequency signals that are greater than ($>$) 20 kilohertz; may be configured to exchange high-frequency signals that are in the range between greater than 20 kilohertz and 1 megahertz; and/or may be configured to: i) monitor the wireless network for an event; ii) modify the wireless network if an event is detected; and iii) provide a notification if an event is detected.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. As such, it will be apparent, however, to one skilled in the art, that many modifications and variations to the embodiments described herein are possible. All such modifications and variations are intended to be within the scope of the present invention, as defined by the appended claims.

The invention claimed is:

1. A method of communicating data among a plurality of communication nodes, the method comprising:
   obtaining data for a system;
   creating a communication network based on the obtained data, wherein the communication network includes a plurality of communication nodes, wherein the creation of the communication network comprises selecting one of one or more frequency bands, one or more individual tones, one or more coding methods, and any combination thereof;
   profiling the communication network in a testing unit to obtain diagnostic telemetry data;
   configuring the communication network at least partially based on the diagnostic telemetry data;
   installing the communication network associated with the system into a wellbore;

communicating between the plurality of communication nodes in the wellbore, based on multiple frequency shift keying (MFSK) telemetry, to perform operations for the system, the MFSK telemetry using a number of tones; and adjusting frequencies used in the MFSK telemetry by
dividing a range of possible reception frequencies into a number of sections;
combining similar reception frequencies into one of the number of sections, thereby forming a
combined frequency in each of the number of sections, wherein all frequencies within each
combined frequency is classified as a single frequency;
determining whether each combined frequency satisfies a signal strength threshold; and
selecting a number of combined frequencies that satisfy the signal strength equal to the
number of tones used by the MFSK telemetry;

the method further comprising:
i) monitoring the communication network for an event;
ii) modifying the communication network if the event is detected;
iii) continuing the communicating between the plurality of communication nodes if the event is not detected; and
repeating steps i) to iii) until the hydrocarbon operations are complete.

2. The method of claim 1, further comprising adjusting frequencies used in the multiple frequency shift keying telemetry based on the profiling in the testing unit.

3. The method of claim 2, wherein the adjusting frequencies used in multiple frequency shift keying telemetry comprises adjusting amplitudes of exchanged signals between a pair of communication nodes in the plurality of communication nodes.

4. The method of claim 2, wherein the adjusting frequencies used in multiple frequency shift keying telemetry comprises adjusting signal strength of exchanged signals between a pair of communication nodes in the plurality of communication nodes.

5. The method of claim 1, further comprising:
obtaining measurements from one or more of the plurality of communication nodes, wherein the plurality of communication nodes are disposed along one or more tubular members; and
performing hydrocarbon operations with the obtained measurements.

6. The method of claim 1, wherein the profiling of the communication network in the testing unit comprises disposing each of the plurality of communication nodes along one of one or more test tubular members in the testing unit and the plurality of communication nodes are spaced apart along the one or more test tubular members at a distance of at least one foot.

7. The method of claim 1, wherein the profiling of the communication network in the testing unit comprises disposing each of the plurality of communication nodes along a test tubular member in the testing unit and spaced apart along the test tubular member at a distance in a range between 1 foot and 20 feet.

8. The method of claim 1, wherein the profiling of the communication network in the testing unit comprises disposing each of the plurality of communication nodes along a test tubular member in the testing unit and spaced apart along the test tubular member at a distance in a range between 2.5 feet and 5 feet.

9. The method of claim 1, wherein the communicating between the plurality of communication nodes comprises exchanging low-frequency signals that are less than or equal to ($\leq$)20 kilohertz.

10. The method of claim 1, wherein the communicating between the plurality of communication nodes comprises exchanging low-frequency signals that are in the range between 100 hertz and 20 kilohertz.

11. The method of claim 1, wherein the communicating between the plurality of communication nodes comprises exchanging high-frequency signals that are greater than ($>$) 20 kilohertz.

12. The method of claim 1, wherein the communicating between the plurality of communication nodes comprises exchanging high-frequency signals that are in the range between greater than 20 kilohertz and 1 megahertz.

13. The method of claim 1, wherein a first set of the plurality of communication nodes are disposed in unmonitored sections of a wellbore and a second set of the plurality of communication nodes are disposed in monitored sections of the wellbore.

14. The method of claim 1, wherein the event is a failure of the communication network to operate properly along the one or more tubular members.

15. The method of claim 1, wherein the event is detection of a change in an acoustic environment along the one or more tubular members.

16. The method of claim 1, wherein the event is the lapsing of a time period without successfully decoding a received communication.

17. The method of claim 1, further comprising adjusting the one or more coding methods if the event is detected.

18. The method of claim 1, wherein the modifying the communication network further comprises dynamically adjusting one of operation frequency bands, digital coding methods, and any combination thereof.

19. The method of claim 1, wherein the data is associated with equipment installed within the wellbore and the configuration of the wellbore equipment.

20. The method of claim 1, wherein the selection of one or more coding methods further comprises determining a set of clock ticks for communication between communication nodes.

21. The method of claim 20, wherein the coding method comprises performing frequency combining with two or more clock ticks per tone in communication between communication nodes.

22. The method of claim 1, further comprises adjusting the configuration of the communication nodes in the communication network at least partially based on the acoustic media to change the one or more frequency bands.

23. A system for modeling communications between a plurality of communication nodes along one or more tubular members, the system comprising:
a testing unit comprising:
a housing with an interior region formed by the housing;
one or more tubular members disposed within the housing; and
a communication network disposed within the housing, wherein each of a plurality of communication nodes are disposed along the one or more tubular members and spaced apart along the one or more tubular members at a distance greater than one foot, each of the plurality of communication nodes being configured to exchange data using multiple frequency shift keying (MFSK) telemetry, and wherein the communication network is established by selecting one of one or more frequency bands, one or more individual tones, one or more coding methods, and any combination thereof;
   wherein frequencies used in the MFSK telemetry are configured to be adjusted by dividing a range of possible reception frequencies into a number of sections;
      combining similar reception frequencies into one of the number of sections, thereby forming a combined frequency in each of the number of sections, wherein all frequencies within each combined frequency is classified as a single frequency;
      determining whether each combined frequency satisfies a signal strength threshold; and
      selecting a number of combined frequencies that satisfy the signal strength equal to the number of tones used by the MFSK telemetry; and
wherein each of the plurality of communication nodes are configured to:
   i) monitor the communication network for an event;
   ii) modify the communication network if the event is detected; and
   iii) provide a notification if the event is detected.

24. The system of claim 23, wherein the communication network in the testing unit comprises each of the plurality of communication nodes are disposed along the one or more tubular members and the plurality of communication nodes are spaced apart along the one or more tubular members at a distance of at least one foot.

25. The system of claim 23, wherein the communication network in the testing unit comprises each of the plurality of communication nodes are disposed along the one or more tubular members and the plurality of communication nodes are spaced apart along the one or more tubular members at a distance in a range between 2.5 feet and 5 feet.

26. The system of claim 23, wherein the plurality of communication nodes are configured to exchange low-frequency signals that are less than or equal to ($\leq$)20 kilohertz.

27. The system of claim 23, wherein the plurality of communication nodes are configured to exchange low-frequency signals that are in the range between 100 hertz and 20 kilohertz.

28. The system of claim 23, wherein the plurality of communication nodes are configured to exchange high-frequency signals that are greater than (>) 20 kilohertz.

29. The system of claim 23, wherein the plurality of communication nodes are configured to exchange high-frequency signals that are in the range between greater than 20 kilohertz and 1 megahertz.

30. The system of claim 23, wherein the selection of one or more coding methods further comprises determining a set of clock ticks for communication between communication nodes.

31. The system of claim 30, wherein the coding method comprises performing frequency combining with two or more clock ticks per tone in communication between communication nodes.

32. The system of claim 23, further comprises adjusting the configuration of the communication nodes in the communication network at least partially based on the acoustic media to change the one or more frequency bands.

33. The system of claim 23, wherein each of the communication nodes may be configured to perform frequency combining with two or more clock ticks per tone.

34. The system of claim 23, wherein the test unit comprises:
   a housing with an interior region formed by the housing;
   the one or more tubular members disposed within the housing; and
   the communication network disposed within the housing.

35. The method of claim 1, wherein the modifying the communication network further comprises adjusting frequencies used in the MFSK telemetry by
   dividing a range of possible reception frequencies into a number of sections;
   combining similar reception frequencies into one of the number of sections, thereby forming a combined frequency in each of the number of sections, wherein all frequencies within each combined frequency is classified as a single frequency;
   determining whether each combined frequency satisfies a signal strength threshold;
   selecting a number of combined frequencies that satisfy the signal strength equal to the number of tones used by the MFSK telemetry; and
   using the selected number of combined frequencies in the MFSK telemetry.

36. The system of claim 23, wherein communication network is configured to be modified by adjusting frequencies used in the MFSK telemetry by
   dividing a range of possible reception frequencies into a number of sections;
   combining similar reception frequencies into one of the number of sections, thereby forming a combined frequency in each of the number of sections, wherein all frequencies within each combined frequency is classified as a single frequency;
   determining whether each combined frequency satisfies a signal strength threshold;
   selecting a number of combined frequencies that satisfy the signal strength equal to the number of tones used by the MFSK telemetry; and
using the selected number of combined frequencies in the MFSK telemetry.

* * * * *